(12) United States Patent
Johansson et al.

(10) Patent No.: US 10,521,984 B1
(45) Date of Patent: Dec. 31, 2019

(54) CHALLENGE-RESPONSE BADGE

(71) Applicant: Amazon Technologies, Inc., Seattle, WA (US)

(72) Inventors: Jesper Mikael Johansson, Redmond, WA (US); Eric Allan MacIntosh, Mountain View, CA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/675,654

(22) Filed: Mar. 31, 2015

(51) Int. Cl.
*G07C 9/00* (2006.01)
*H04L 29/06* (2006.01)

(52) U.S. Cl.
CPC ..... *G07C 9/00039* (2013.01); *G07C 9/00571* (2013.01); *H04L 63/0838* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0090365 | A1* | 5/2003 | Bergerhoff | B60R 25/20 340/5.61 |
| 2004/0203600 | A1* | 10/2004 | McCorkle | G01S 7/023 455/411 |
| 2007/0106892 | A1* | 5/2007 | Engberg | G06Q 20/02 713/168 |
| 2009/0219135 | A1* | 9/2009 | Harvey | B60R 25/2018 340/5.82 |
| 2010/0250812 | A1* | 9/2010 | Webb | G06F 21/32 710/301 |
| 2011/0076986 | A1* | 3/2011 | Glendinning | G06F 21/88 455/411 |
| 2011/0291803 | A1* | 12/2011 | Bajic | G08B 13/2462 340/10.1 |
| 2012/0204245 | A1* | 8/2012 | Ting | G06F 21/35 726/6 |
| 2013/0154799 | A1* | 6/2013 | Moran | G06K 7/0008 340/9.11 |
| 2013/0232082 | A1* | 9/2013 | Krawczewicz | G06F 19/323 705/55 |

(Continued)

*Primary Examiner* — Nabil H Syed
*Assistant Examiner* — Cal J Eustaquio
(74) *Attorney, Agent, or Firm* — Davis Wright Tremaine LLP

(57) ABSTRACT

Techniques described and suggested in the present document include access-card systems and methods that are resistant to attack. In certain implementations, a card reader transmits a challenge message to an access card. When the access card receives the challenge message, the access card validates the challenge message, and then generates a response message based at least in part on the information contained in the challenge message. A security server validates the response message, and when the security server determines that the response is secure, valid, and from an authorized access card, the security server grants access to a physical space. In some implementations, the challenge and response messages are digitally signed using a cryptographic key. Additional implementations include various tests that, when performed on the challenge and/or response messages detect and defeat many attempts to compromise the access-card system.

15 Claims, 16 Drawing Sheets

(56) References Cited

U.S. PATENT DOCUMENTS

2014/0351881 A1* 11/2014 Das .................. G06F 21/00
   726/1
2015/0003358 A1* 1/2015 Wang ................ H04L 63/20
   370/329

* cited by examiner

CHALLENGE-RESPONSE BADGE

BACKGROUND

Maintaining physical security is important to many government, corporate, and private institutions. One aspect of physical security is controlling access to facilities such as corporate offices, datacenters, and storage rooms. Many institutions administer access control by issuing access cards to authorized persons. Each authorized person presents their access card at the entrance of a facility in order to gain access. In some environments, the access card is presented to a security guard, and the security guard checks the validity of the access card by comparing a photograph printed on the card to the person requesting entry. The physical appearance of the access card, as well as graphics printed on the card may be used to verify that the card was issued by the institution. However, as access to modern printing and manufacturing techniques has increased, it has become easier to forge access cards that rely only on printed graphics.

In some contemporary access-card systems, information stored on the access card is read by a card reader positioned near each entrance to the facility. In some implementations, the electronic reader reads a card identifier from the access card. The card identifier is then transmitted to a central computer system that compares the card identifier to a list of authorized card identifiers. If the card identifier is in the list of authorized card identifiers, an electronic latch near the card reader is activated, unlocking the entrance to the secure facility. In some implementations, the card identifier is read using a barcode or magnetic stripe on the access card. However, for a variety of reasons, many card readers use radio frequency (RF) communication to read information from the access card. RF-based access cards are convenient because authorized persons can merely position their access card near the card reader to gain access to the facility. In some implementations, the communication between the access card and the reader is able to span a distance of several feet or more in normal use.

Since the communication between the access card and the reader occurs over a distance, there is a risk that an unauthorized person might intercept the communications between the access card and the card reader in an attempt to gain access. In certain situations, by using specialized equipment, unauthorized persons are able to interrogate certain types of RF-based access cards from across a room without the card owner's knowledge. In some situations, the information gained by such eavesdropping can be used to create a forgery of the authorized person's access card without their knowledge.

BRIEF DESCRIPTION OF THE DRAWINGS

Various embodiments in accordance with the present disclosure will be described with reference to the drawings, in which.

DETAILED DESCRIPTION

Figure 1:
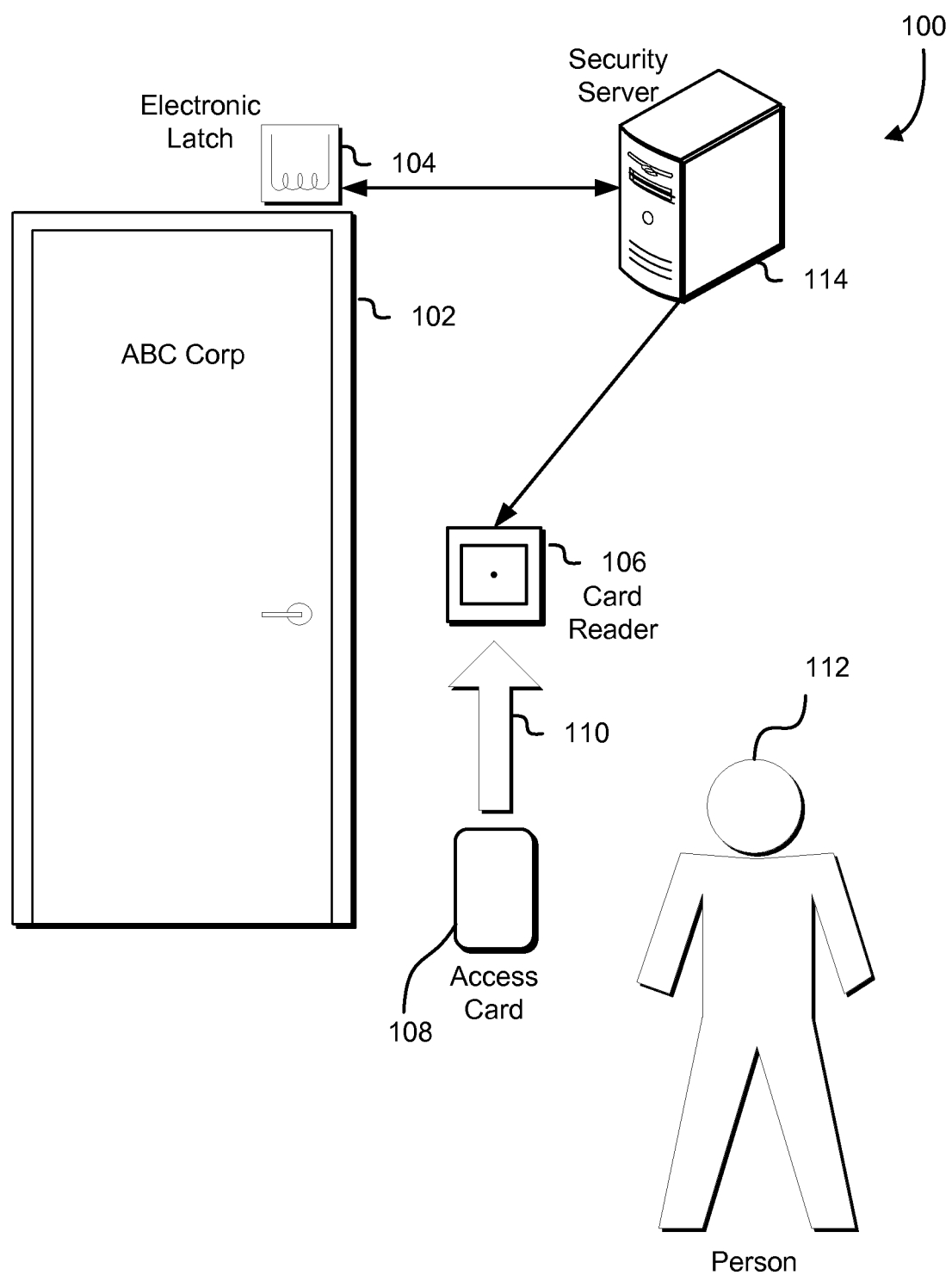
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include access-card systems and methods that resist attempts to compromise the access-card system. In certain implementations, a card reader transmits a challenge message when an access card is detected in close proximity to the card reader. When the access card receives the challenge message, the access card generates a response message based at least in part on the information contained in the challenge message, and transmits the response message back to the card reader. In some implementations, the challenge and response messages are digitally signed using a cryptographic key. In such implementations, the challenge and response messages become resistant to tampering or forgery. Additional implementations include various tests that, when performed on the challenge and/or response messages detect and defeat many attempts to compromise the access-card system.

In one example, the access card system detects a replay attack by including a sequence value in each challenge message transmitted by the card reader. When a new challenge is created, the new challenge message includes a sequence value that is greater than previously included challenge numbers. When the access card receives the new challenge message, the access card compares the sequence value in the new challenge message to a high-water-mark value. The high-water-mark value, in an embodiment, is the sequence value of the last previously-received valid challenge message. If the high-water-mark value is more recent than the sequence value included in the new challenge message, the access card determines that the challenge is invalid. When the access card determines that the new challenge is valid, the high-water-mark value is updated based at least in part on the sequence value in the new challenge message and is stored on the access card. In some implementations, the sequence value is a timestamp. In another implementation, the sequence value is a sequential integer. In yet another implementation, the sequence value is a numerically comparable value. The sequence value can be derived from any ordered set of values such that the values in the set can be compared to one-another to form a sequence.

In another example, an access card includes an electronic clock and a challenge message includes a timestamp based at least in part on when the challenge message was transmitted. When the access card receives the challenge message, the timestamp is compared to the value of the electronic clock. When the comparison indicates that the challenge message is older than a timeout value, the access card determines that the challenge message is invalid.

In some implementations, the sequence value is generated by a first time-synchronized one-time password ("OTP") generator located on the security server that is synchronized with a second time-synchronized OTP generator located on the access card. In such implementations, the access card compares the received sequence value to an OTP generated by the card. In certain implementations, the received sequence value is compared to more than one previously generated OTP's generated within the timeout value.

Various implementations are described that detect man-in-the-middle attacks. In some implementations, man-in-the middle attacks are detected by measuring the time period between transmission of the challenge message and the receipt of the response message. When the time period between the transmission of the challenge message and the receipt of the response message exceeds a maximum threshold, access to the facility is denied even when the received response is otherwise valid. In certain implementations, a man-in-the-middle-attack is detected using geolocation facilities (e.g., a global positioning system sensor) on the access card. When a challenge message is received by the access card, the access card compares the geolocation of the access card with the geolocation of the card reader that sent the challenge message. When the location of the card reader and the access card do not substantially match, the man-in-the-middle attack is detected, and the access card does not transmit a valid response message.

The threshold for determining that the location of the card reader and the location of the access card do not substantially match is based on location measurements that indicate that the card reader and the access card are further apart than the operating range of the card reader, and the accuracy of the location measurements. For example, If the location measurement of the card is accurate to within 20 m, and the location measurement of the card reader is accurate within 10 m, and the operating range of the card reader is 1 m, then the threshold for determining that the location of the card reader and the access card do not substantially match is 31 m.

Access cards are an example of a form factor for an access token device that can be used with the techniques of the present disclosure. Access token devices come in a variety of form factors including laminated plastic cards, key fobs, stickers, dongles, license plate holders, vehicle tags, resonant wires, pet collars, under-the-skin capsules, circuitry of mobile devices and other form factors. While the present disclosure uses access cards and associated devices (e.g., access card readers), the techniques described herein and variations thereof can be adapted to other access token devices, such as listed above. In some environments, access cards are embedded into another device such as a cell phone, mobile device, tablet computer, cell-phone case or housing. Card readers are often positioned near entryways to secured facilities such as office buildings, and control access via an electronic latch or electric strike that is connected to a door. In some implementations, access to a physical space is granted by providing an indication to a guard, or by providing an indication to the cardholder. Indications can be presented in a variety of forms such as a visible light, an audible buzzer, or haptic feedback provided by a haptic device. In another implementation, access to the physical space is controlled by presenting an indication to a guard when unauthorized access is attempted. Other form factors of card readers include card readers positioned around roadways to read access cards on passing vehicles, handheld readers that scan under-the-skin chips in dogs, cats, and other animals, and vehicles that detect a key-fob access card in lieu of a mechanical key. Examples presented in the current document are applicable to these other form factors and environments. Although many examples described in the present document are illustrated in the context of access to a physical space, access-card-based security systems can be used to control access to other types of facilities such as computer systems, computer networks, payment systems, roads, transportation systems, and motor vehicles. When the security system controls access to a payment system, the card reader can be a payment terminal, ATM, point-of-sale terminal, or other financial-transaction portal. Access token devices can be made in the form of a credit or debit card, dongle, or even under-the-skin wireless chip. When the financial-transaction portal validates the response message, an electronic payment or other financial transaction is performed.

FIG. 1 shows an illustrative example of an environment 100 in which various embodiments may be practiced. Environment 100 includes an entry door 102 that permits entrance to a facility that is secured by a card-access system. The entry door 102 is secured by an electronic latch 104 such as an electric strike. Electric strikes are available in fail-secure and fail-safe configurations. Fail-secure electric strikes remain locked in the event of a power failure, and fail-safe electric strikes automatically unlock in the event of a power failure. Either type of electric strike is suitable for use as electronic latch 104. A card reader 106 is positioned near the entry door 102 so that various persons requesting access are able to present their access card to the card reader 106 for validation. When an authorized person 112 approaches the entry door 102, the authorized person 112 positions 110 an access card 108 near the card reader 106.

When the access card 108 moves within communication range of the card reader 106, an RF-communication link is established between the card reader 106 and the access card 108. In some implementations, the RF-communication link is operable over a range of at least several feet.

Once communication between the card reader 106 and the access card 108 is established, information is exchanged between the access card 108 and a security server 114. Based at least in part on the information received by the security server 114, the validity of the access card 108 is determined. If the security server 114 determines that the access card 108 is valid, entry to the facility is granted by activating the electronic latch 104. The activation of the electronic latch unlocks a door, permitting entry. In some implementations, the security server 114 grants access to the facility by activating a motor or other device that opens the door. In particular implementations, the unlocking activity is replaced by the action of opening the door. Similar entry configurations can be used to secure loading bay doors, store rooms, vehicle entrance gates, interior office spaces, locker rooms, road toll ways or other physical spaces where access restrictions are enforced. In some implementations, the functions of the security server 114 are integrated partly or wholly into the card reader. For example, in some implementations the electronic latch 104 is connected to and activated by the card reader 106. In another example, the card reader 106 performs part or all of the card-validation process.

Access cards and card readers (and other access token devices and readers of such devices) are not limited to using RF communication technologies. A communication channel may be established using various technologies, such as induction wireless, infrared wireless, or technologies operating according to specifications and protocols provided by the Infrared Data Association ("IrDA"). In some implementations, the access-card system may utilize short-range, low-power and high-frequency radio transmissions, such as Bluetooth® or ultra wideband formats. In still other implementations, the access-card system may support acoustic-based data transfer. For example, the card reader may include software components and a speaker that enable the card reader to broadcast data to the access card as sound waves, while the access card may include software components and microphone that enable the access card to receive the data embedded in the sound waves. Thus, one or more of radio signal-based data transfer (e.g., near field communication ("NFC") or Bluetooth®), light-based data transfer (e.g., infrared data transfer), an acoustic-based data transfer (e.g., sound wave-embedded data), or magnetic-field-based transfer (e.g., reading data from a magnetic stripe) may be used for inter-device communication. Various examples described in the present document utilize radio frequency identification ("RFID") or NFC to establish a communication link between an access card and a card reader. In general, this should not be considered limiting, as other forms of short-range communications are acceptable alternatives.

Figure 2:
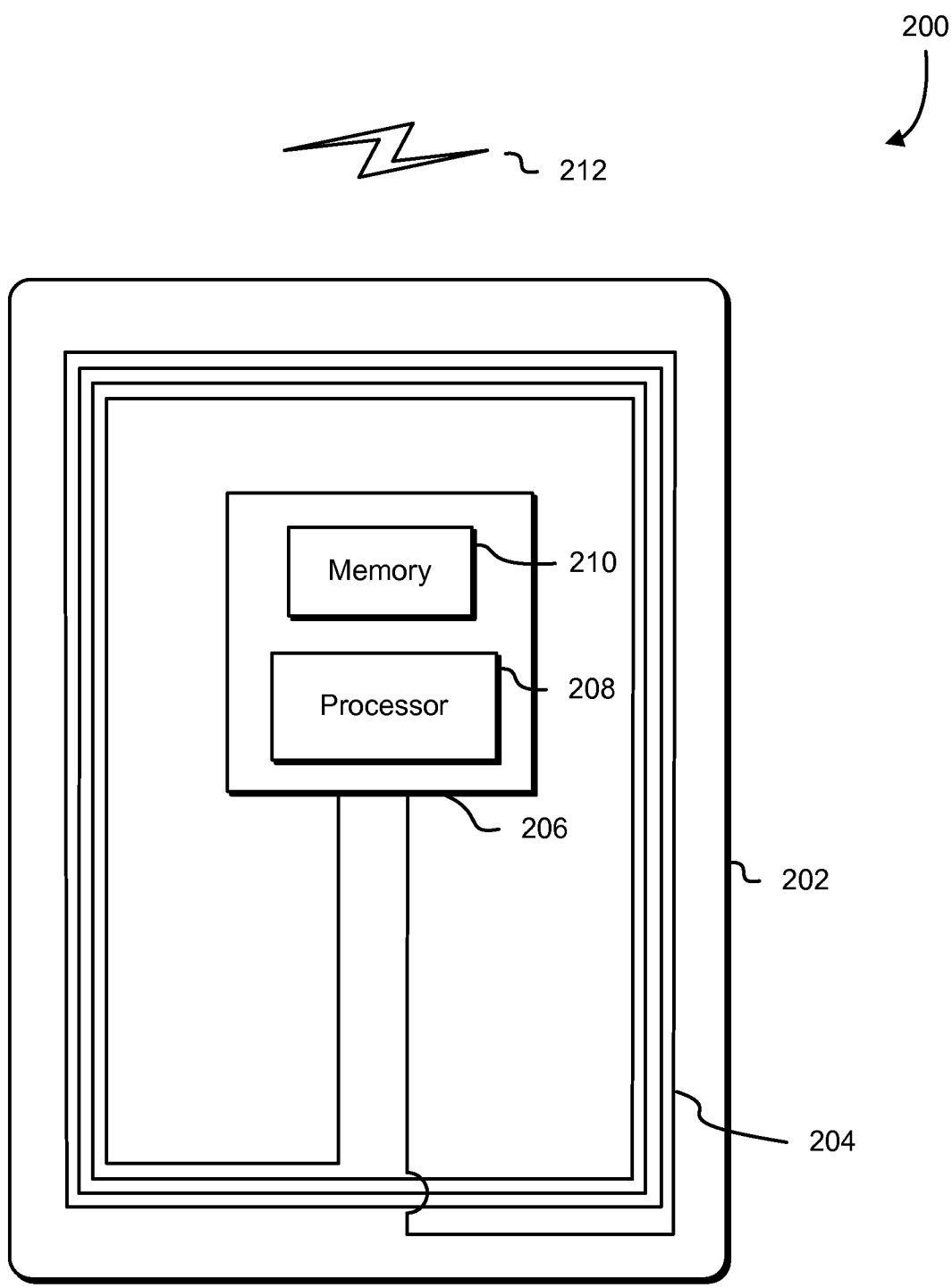
FIG. 2 illustrates an example of an access card in accordance with an embodiment.

FIG. 2 illustrates an example of an access card 202 in accordance with an embodiment. While FIG. 2 shows an example of an access card, components of the access card may be incorporated into other access token devices, such as noted above. The access card 202 includes an RF antenna 204 capable of establishing a bidirectional RF communication link 212 with a card reader. In some implementations, the access card 202 is powered by electrical power received through the RF antenna. In other implementations, the access card 202 is powered using a battery on the access card. The RF antenna 204 is connected to an RFID chip 206 that includes a processor 208 and a memory 210. When the access card 202 is within communication range of a card reader, the card reader detects the access card 202. In some implementations, the card is detected by the presence of the RF antenna 204. A resonant coil, located in the card reader, generates short bursts of 20 to 50 microseconds and detects the damping caused by a nearby access card's antenna. In other implementations, the access card 202 is detected by a capacitive proximity sensor. When the access card 202 is powered, the processor 208 executes instructions stored on the memory 210 to receive, process, and respond to messages from the card reader. In many implementations, memory 210 also includes non-volatile memory used for storing configuration information, as well as volatile memory for use during execution of the stored instructions.

Before an access card is issued to an authorized person, memory 210 is initialized with key information that identifies the access card and, in certain implementations, enhances the security of communication link 212. The key information can be stored when the card is manufactured, or when the card is issued to an authorized person by the owner of the facility. In certain implementations, the key information that is stored in memory 210 is maintained in a portion of memory 210 that is not externally readable. For example, in some implementations, a private cryptographic key of a public-private key pair is stored in a non-externally-readable portion of memory 210. In another implementation, the card is provisioned with a private key of a public-private key pair and also provisioned with a digital certificate that encodes or otherwise references the public key of the key pair. In yet another implementation, the card is provisioned with a symmetric cryptographic key that is a secret shared with a security server.

Figure 3:
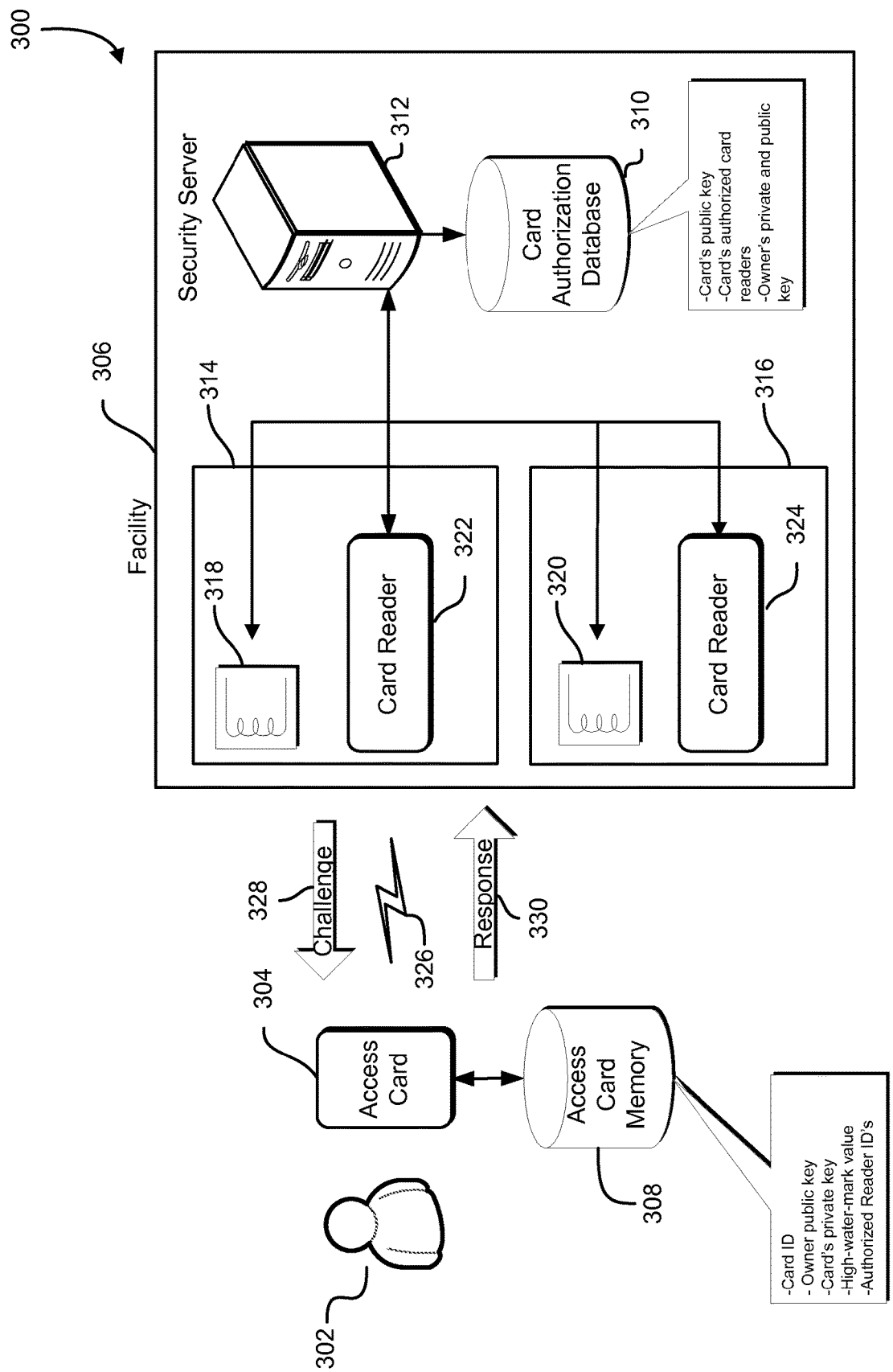
FIG. 3 shows an illustrative example of an environment that includes a system that controls access to a secure facility in accordance with an embodiment.

FIG. 3 shows an illustrative example of an environment 300 that includes an access-card system in accordance with an embodiment. An authorized person 302 is issued an access card 304 by an owner of a facility 306. Before the access card 304 is issued to the authorized person 302, a card ID, a public cryptographic key associated with the security server, a private cryptographic key associated with the access card 304, and a list of card readers, are stored on an access card memory 308. In one implementation, an initial high-water-mark value is stored on the access card memory 308 before the card is issued. In another implementation, the initial high-water-mark value is established the first time the access card is used. The card ID, a list of approved card readers, a public cryptographic key associated with the access card 304, and a private cryptographic key associated with the security server are retained in a card authorization database 310 administered by a security server 312. The card authorization database is accessible to the security server, and holds information related to issued access cards, including the issued cards' owners, where each card may be used to gain access (authorized readers), and cryptographic keys used by the security system. The security server 312 is in communication with one or more entry points 314 and 316. In the illustrated example, each entry point has an associated electronic latch 318, 320 and an associated card reader 322, 324. In additional implementations, the electronic latches 318 and 320 are replaced with a motorized door, turnstile, parking gate, elevator, or other physical barrier, where granting access can be electronically controlled. When the authorized person 302 approaches the first entry point 314, a communication link 326 is established between the access card 304 and the card reader 322. In some implementations, the card reader 322 detects the presence of the access card 304 and causes a challenge message 328 to be transmitted from the card reader 322 to the detected access card 304. In other implementations, the card reader 322 periodically transmits a challenge message 328, and then listens for a response message 330, in order to detect the access card 304. In yet other implementations, the card reader 322 transmits an RF signal that detects the presence of an antenna in the access card 304. When the antenna is detected, the card reader 322 causes the challenge message 328 to be transmitted.

In certain implementations of the system, the challenge message 328 is digitally signed with a private cryptographic key maintained as a secret within the security server, and the response message 330 is signed with a private cryptographic key associated with the authorized user's access card 304. In other implementations, the response message 330 is digitally signed with the private cryptographic key associated with the authorized user's access card 304, and the challenge message 328 is not signed. When the challenge message 328 is not signed, the signed response message 330 is based at least in part on at least a portion of the challenge message 328. Although the access card 304 cannot validate the digital signature of the challenge message when the challenge message 328 is not signed, the access card 304 may validate other content of the challenge message before transmitting the response message 330. Various examples of challenge-response scenarios are illustrated in FIG. 4 through FIG. 9.

Figure 4:
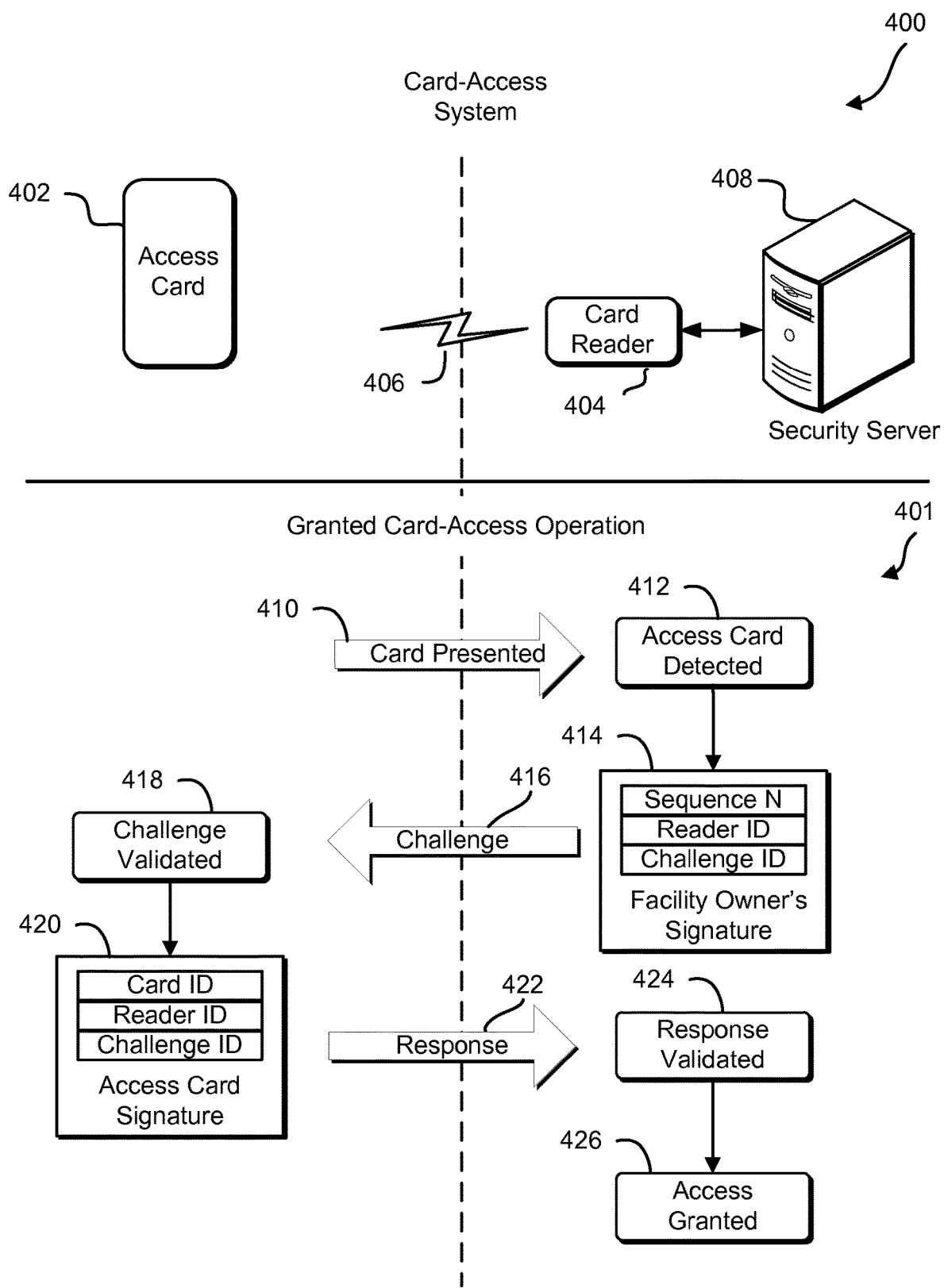
FIG. 4 shows an illustrative example of a system that controls access to a facility, and further shows an example of a challenge-response process that, when performed, grants access to the facility in accordance with an embodiment.

FIG. 4 shows an illustrative example of a system 400 that controls access to a facility, and further shows an example of a challenge-response process 401 that, when performed, grants access to the facility in accordance with an embodiment. An access card 402 that has been issued to an authorized person is presented to a card reader 404. The access card 402 and the card reader 404 communicate over an RF communication link 406 such as a RFID or NFC link. The card reader 404 relays information between the access card 402 and a security server 408. The security server 408 controls access to the facility and maintains information associated with the issued access cards. In the challenge-response process 401 illustrated on the lower portion of FIG. 4, the operations shown on the left side of the page are performed by the access card 402, and the operations shown on the right side of the page are performed by the security server 408. In certain implementations, some operations are delegated from the security server 408 to the card reader 404. In other implementations, the card reader 404 and security server 408 are combined into an integrated unit.

The lower portion of FIG. 4 shows an example of a challenge-response process 401 that, when performed, grants access to the facility. A card-presentation arrow 410 represents the access card 402 being presented at the card reader 404. The card reader 404 detects the presence of the access card 402 at block 412. A signal is sent from the card reader 404 to the security server 408 that indicates the presence of the access card 402. In response to the signal, the security server 408 generates a challenge message 414 that includes a sequence value, a reader identifier ("ID") associated with the card reader, and a challenge ID that identifies the challenge message 414. The challenge message 414 is digitally signed using a private cryptographic key maintained as a secret within the security server. Next, the signed challenge message is sent to the card reader 404 and transmitted to the access card 402 over the communication link 406 as represented by a challenge arrow 416.

When the access card 402 receives the challenge message, the access card 402 performs a challenge-validation operation 418 on challenge message. The challenge-validation operation 418 includes one or more separate challenge-message tests, and each test must be successful to determine that the received challenge message is valid. Examples of challenge-message tests include: validating that the challenge message is properly signed with a digital signature maintained by the security server; validating that the sequence value is above a high-water-mark of past received and valid sequence values; validating that the geolocation of the access card 402 matches the geolocation of the card reader 404; and validating that the reader ID is associated with a particular card reader for which the access card 402 can be authorized. When the challenge message is valid, the access card 402 generates a response message 420. The response message 420 includes a card ID associated with the access card 402, and further includes a copy of the reader ID and the challenge ID contained in the validated challenge message. In certain implementations, the response message includes a checksum based at least in part on the content of the challenge message 414. The response message 420 is signed using the access card's private cryptographic key and is then transmitted to the card reader 404 as represented by a response arrow 422.

When the response message is received by the card reader 404, the response message is forwarded to the security server 408. The security server 408 determines the validity of the response message at block 424 by performing one or more response-message tests. Examples of response-message tests include: validating that the response message is properly signed with the digital signature of the access card 402; validating that the card ID contained in the response message is associated with an access card that has been granted access to the facility; validating that the response was received within a maximum response time period measured from the time that the challenge message was transmitted; and validating that the message was signed with a private cryptographic key that was issued to an access card that has been granted access to the facility.

After the response message has been validated by the security server 408, the security server 408 grants access to the facility at block 426. In one implementation, the security server grants access to the facility by sending a signal that activates an electronic door latch located at a facility entrance near the card reader 404 thereby allowing the person presenting the access card 402 to enter the facility. In certain implementations, access is granted by activating a gate that allows vehicle access to a parking area, or by activating an electric strike that unlocks a door to an office. Other mechanisms for controlling access to a facility or to a portion of a facility are considered as being within the scope of the present disclosure.

In real-word use, access cards are sometimes lost, stolen, or misused. When this happens, the owner of the facility can invalidate the lost or stolen access cards by updating a card-authorization database maintained by the security server 408. In some attack scenarios, attackers attempt to read an authorized person's access card remotely by using a high gain directional antenna from a public place such as a coffee shop. In a successful attack, the attackers may be able to read information from the access card and use the information to make a working counterfeit access card. Various implementations of access cards described in the current document reduce the chance of a successful attack by not responding to a card reader until a received challenge message has been validated. Even when an attacker is able to formulate a valid challenge message by either guesswork or my interrogating an authorized card reader from outside a secure facility, the response message sent by the card is generally not sufficient to make a working counterfeit of the authorized access card because the challenge message issued by the authorized reader varies over time, and the correct response message is based at least in part on the content of the challenge message.

Figure 5:
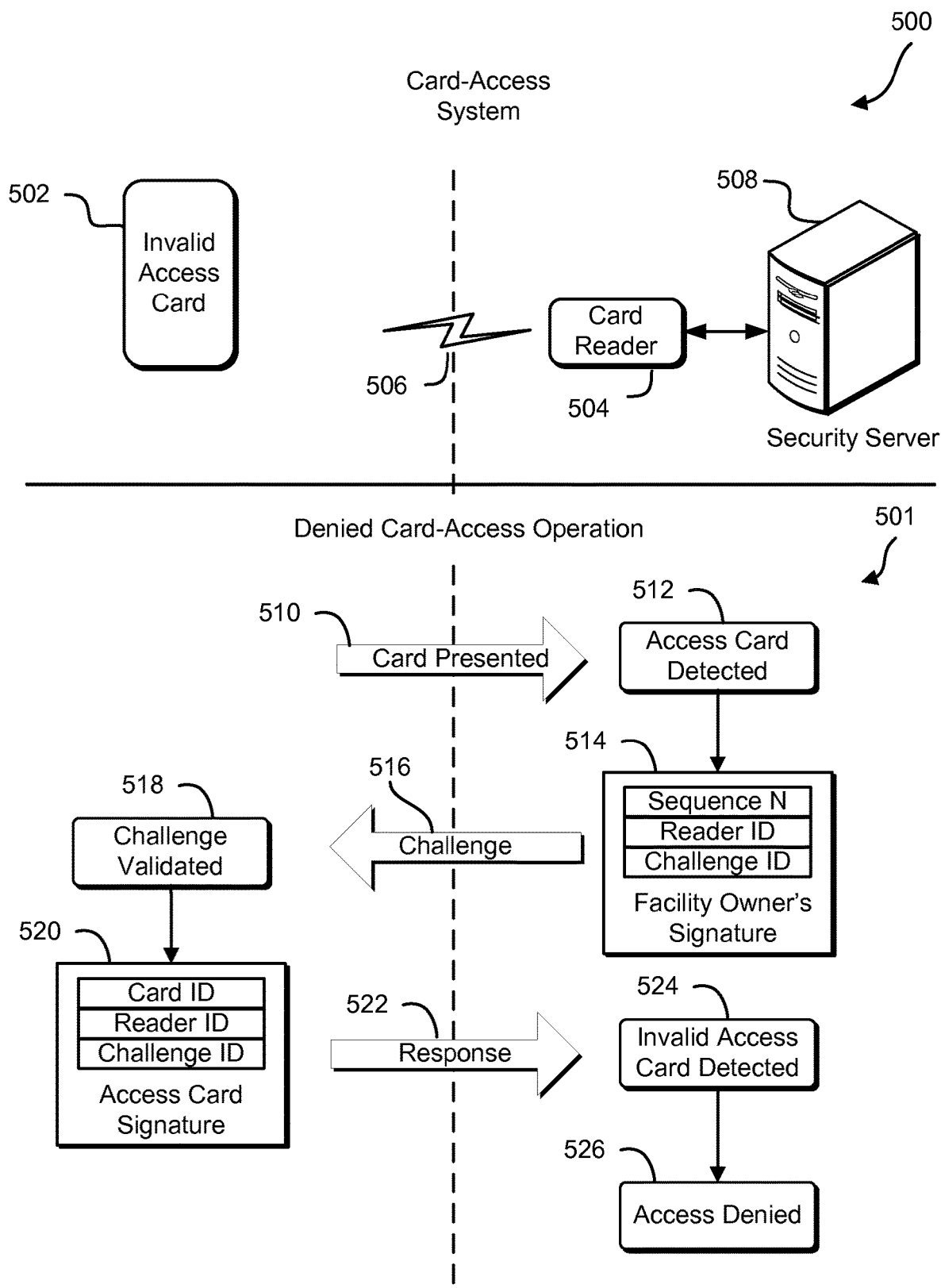
FIG. 5 shows an illustrative example of a system that controls access to a facility, and further shows an example of a challenge-response process involving an invalid access card in accordance with an embodiment.

FIG. 5 shows an illustrative example of a system 500 that controls access to a facility, and further shows an example of a challenge-response process 501 involving an invalid access card in accordance with an embodiment. An invalid access card 502 is presented to a card reader 504. In this example, the invalid access card 502 is invalid because the invalid access card is not registered with the security server in a card authorization database. The invalid access card 502 and the card reader 504 communicate over an RF communication link 506. The card reader 504 relays information between the invalid access card 502 and a security server 508. In the challenge-response process diagram on the lower portion of FIG. 5, the operations shown on the left side of the page are performed by the invalid access card 502, and the operations shown on the right side of the page are performed by the security server 508. In certain implementations, some operations are delegated from the security server 508 to the card reader 504. In other implementations, the functions of the card reader 504 and security server 508 are combined into an integrated card-reader-security-server unit.

The lower portion of FIG. 5 shows an example of a challenge-response process 501 involving an invalid access card in accordance with an embodiment. Card-presentation arrow 510 represents the presentation of the invalid access card 502 at the card reader 504. The card reader 504 detects the presence of the invalid access card 502 at block 512. A signal is sent from the card reader 504 to the security server 508 that indicates the presence of the invalid access card 502. In response to the signal, the security server generates a challenge message 514 that includes a sequence value, a reader ID associated with the card reader, and a challenge ID that identifies the challenge message 514. The challenge message 514 is digitally signed using a private cryptographic key maintained as a secret within the security server. Next, the signed challenge message is sent to the card reader 504 and transmitted to the invalid access card 502 over the communication link 506 as represented by the challenge arrow 516.

When the invalid access card 502 receives the challenge message, the invalid access card 502 performs a challenge-validation operation 518 on challenge message. In some scenarios, the invalid access card determines that the challenge message originates from a card reader where the access card is not authorized, and the card does not generate a response message. In other scenarios, when the challenge message is determined to be valid, the invalid access card 502 generates a response message 520. The response message 520 includes a card ID associated with the invalid access card 502, and further includes a copy of the reader ID and the challenge ID contained in the validated challenge message. In certain implementations, the response message includes a response code based at least in part on the content of the challenge message 514. The response message 520 is signed using the invalid access card's private cryptographic key and is transmitted to the card reader 504 as represented by the response arrow 522.

The invalidity of the invalid access card 502 is detected by the system 500 when the response message 520 is tested for validity by the security server 508 at block 524. When the response message is received by the card reader 504, the response message is forwarded to the security server 508. The security server 508 detects the invalidity of the response message at block 524 by applying one or more response-message tests, and when any response-message test is unsuccessful, the response message is determined to be invalid. Various response-message tests detect an invalid response when: the response message is not properly signed with the digital signature of a valid access card; the card ID contained in the response message is not associated with an access card that has been granted access to the facility; the response message is received outside a maximum response time period measured from the time that the challenge message was transmitted; the response message does not contain the same challenge ID or reader ID as the challenge message; or the message was not signed with a private cryptographic key that was issued to an access card that has access to the facility.

After the security server 508 determines that the response message is invalid, at block 526, the security server 508 does not grant access to the facility. In some implementations, at block 526 the security server records a failed-access-attempt event in a log. In another implementation, at block 526 the security server 508 transmits a disabling message to the invalid access card 502 that renders the invalid access card inoperable. In one example of a disabling message, the security server 508 transmits a disabling challenge message that includes a disabling sequence value. The disabling sequence value represents a maximum value of possible sequence values. The invalid access card 502 stores the disabling sequence value as a new high-water-mark value for sequence values, and the invalid access card 502 will no longer respond to any received challenge messages until the high-water-mark value is reset.

Figure 6:
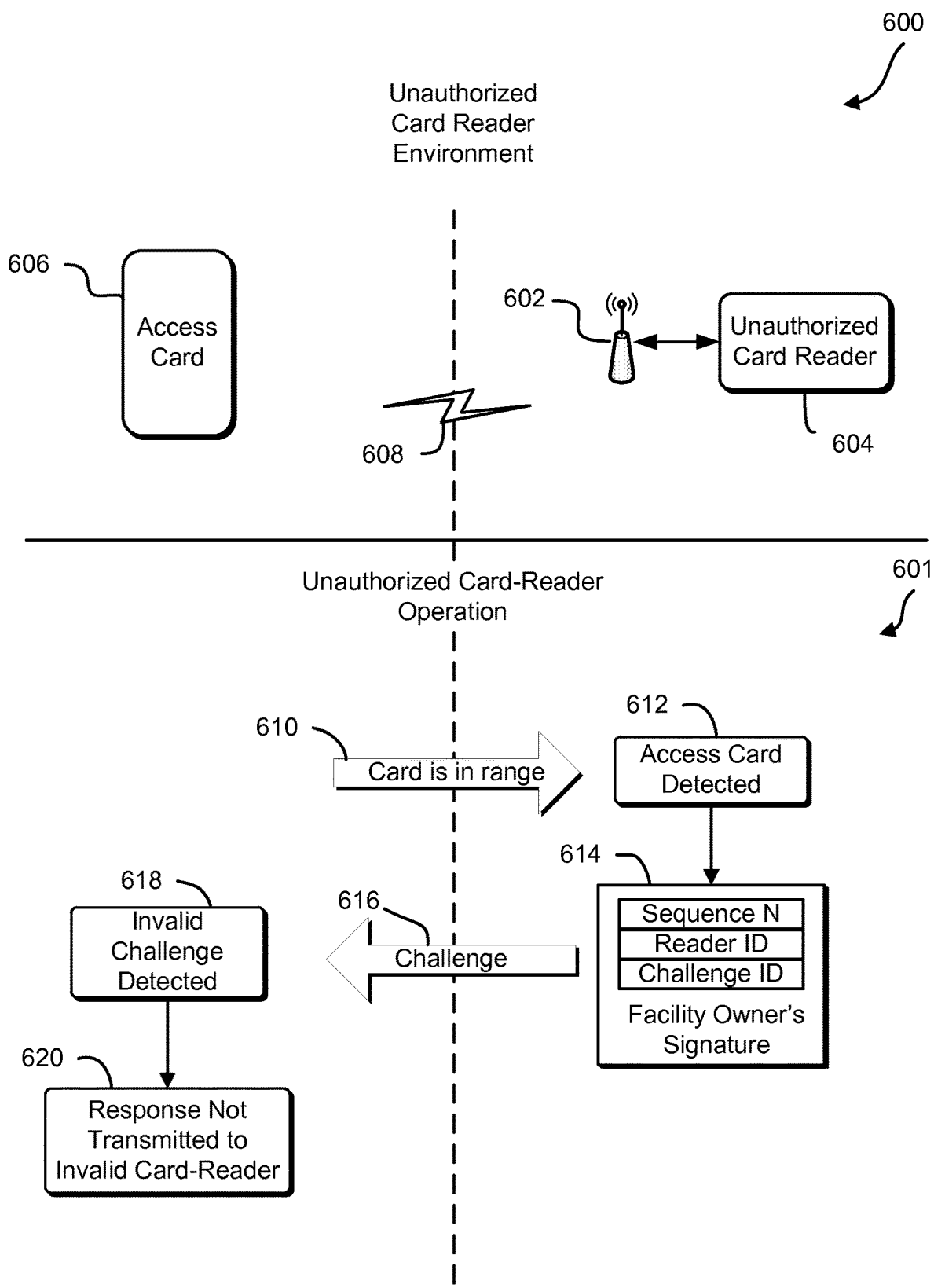
FIG. 6 shows an illustrative example of a system used by an attacker to collect information from an access card, and further shows an example of a challenge-response process with an unauthorized card reader in accordance with an embodiment.

FIG. 6 shows an illustrative example of a system 600 used by an attacker to collect information from an access card, and further shows an example of a challenge-response process 601 with an unauthorized card reader in accordance with an embodiment. A high-gain antenna 602 is connected to an unauthorized card reader 604. The high-gain antenna 602 is directed at an access card 606 from a remote location. In some situations, depending on the type and size of the high-gain antenna, an RF-communication link 608 can be established over a distance greater than 10 meters. In the challenge-response process diagram on the lower portion of FIG. 6, the operations shown on the left side of the page are performed by the access card 606, and the operations shown on the right side of the page are performed by the unauthorized card reader 604.

The lower portion of FIG. 6 shows an example of a challenge-response process 601 with an unauthorized card reader. The challenge-response process begins when the access card 606 is in range of the unauthorized card reader 604 as represented by the card-in-range arrow 610. The unauthorized card reader 604 detects the presence of the access card 606 at block 612. The unauthorized card reader 604 attempts to create a challenge message 614 containing a sequence value, a reader ID, and a challenge ID. In most situations, the unauthorized card reader 604 does not have access to a private cryptographic key maintained as a secret within the security server, and does not sign the challenge message 614. In other situations, the unauthorized card reader 604 uses a random signature to sign the challenge message 614. The transmission of the challenge message 614 to the access card 606 is represented by a challenge-arrow 616. At block 618, the access card 606 receives the challenge message 614 from the unauthorized card reader 604.

When the access card 606 receives the challenge message 614, the access card 606 attempts to validate the challenge message. The access card performs one or more separate challenge-message tests, and if a particular challenge-message test is not successful, the received challenge message 614 is determined to be invalid. Examples of challenge-message tests include: validating that the challenge message is properly signed with a digital signature maintained by the security server; validating that the challenge message's sequence value is above a high-water-mark of previously received and valid sequence values; validating that the geolocation of the access card 606 matches the geolocation of the card reader that is associated with the reader ID contained in the challenge message; and validating that the reader ID is associated with a particular card reader for which the access card 606 can be authorized. Since the unauthorized card reader 604 does not have a valid reader ID, and does not know the ordering of sequence values used by authorized readers, and cannot access the private cryptographic key maintained as a secret within the security server to sign the challenge message, at least one of the above challenge-message tests will fail and the challenge message 614 will be determined to be invalid at block 618. After the challenge message 614 is determined to be invalid, at block 620 the access card does not send a response to the unauthorized card reader 604. In some implementations, the access card records the invalid-challenge event. In another implementation, the access card records the geolocation of the access card when the invalid challenge is received.

Figure 7:
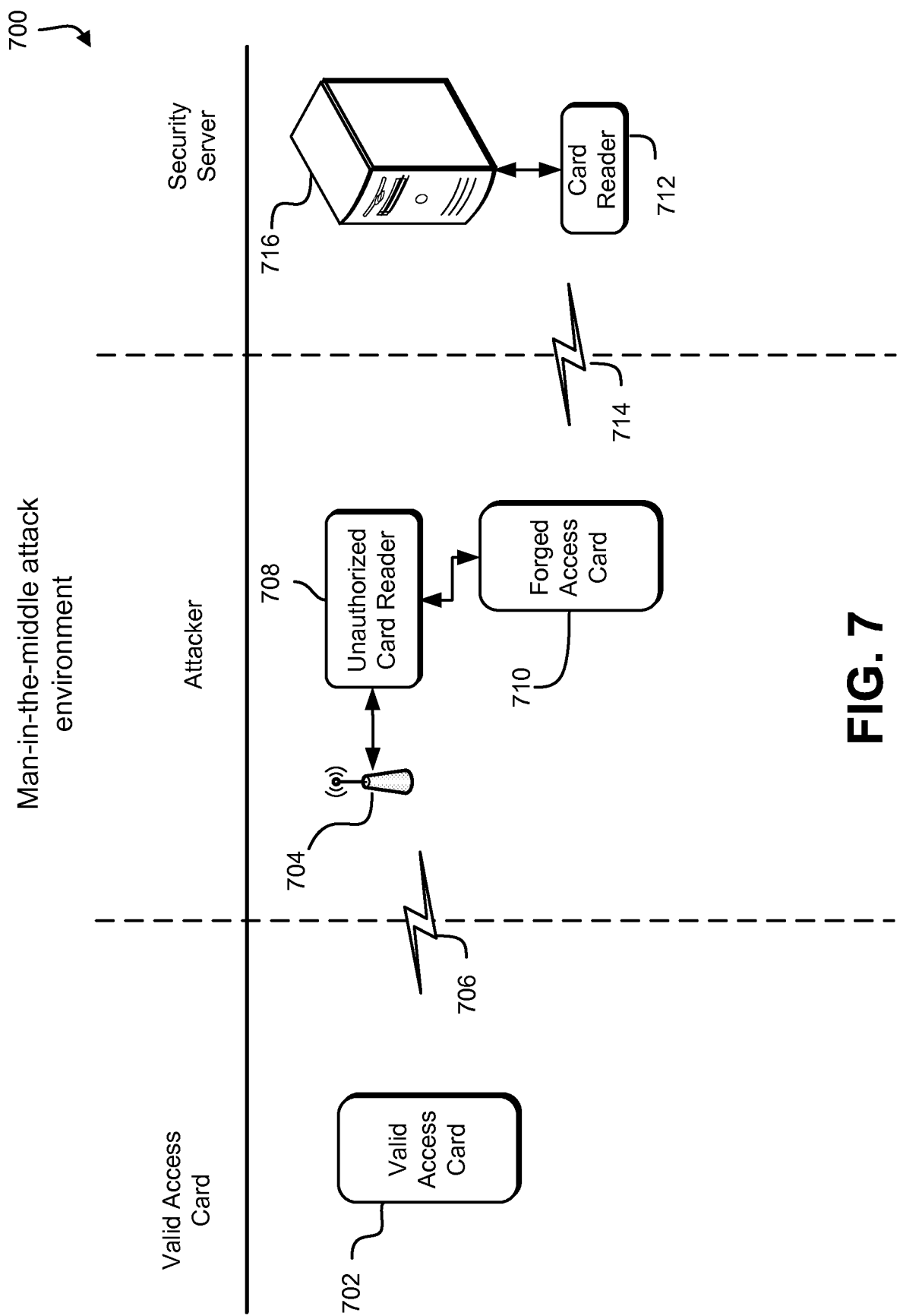
FIG. 7 shows an illustrative example of a system that controls access to a facility while under a man-in-the-middle attack in accordance with an embodiment.

FIG. 7 shows an illustrative example of a system 701 that controls access to a facility while under a man-in-the-middle attack in accordance with an embodiment. A valid access card 702, in the possession of a cardholder, is interrogated by an attacker. The attacker uses a high-gain antenna 704 to establish a long-distance communication link 706 with the valid access card 702 without the knowledge of the cardholder. The high-gain antenna 704 is connected to an unauthorized card reader 708 that is under the control of the attacker. A forged access card 710 is connected to the unauthorized card reader 708, and is in communication with a card reader 712 over a communication link 714. A security server 716 is connected to the card reader 712. The security server 716 and the card reader 712 are under the control of the facility owner. As part of the attack strategy, the attacker relays challenge and response messages between the card reader 712 and the valid access card 702 in an attempt to gain access to the facility with the forged access card 710.

Figure 8:
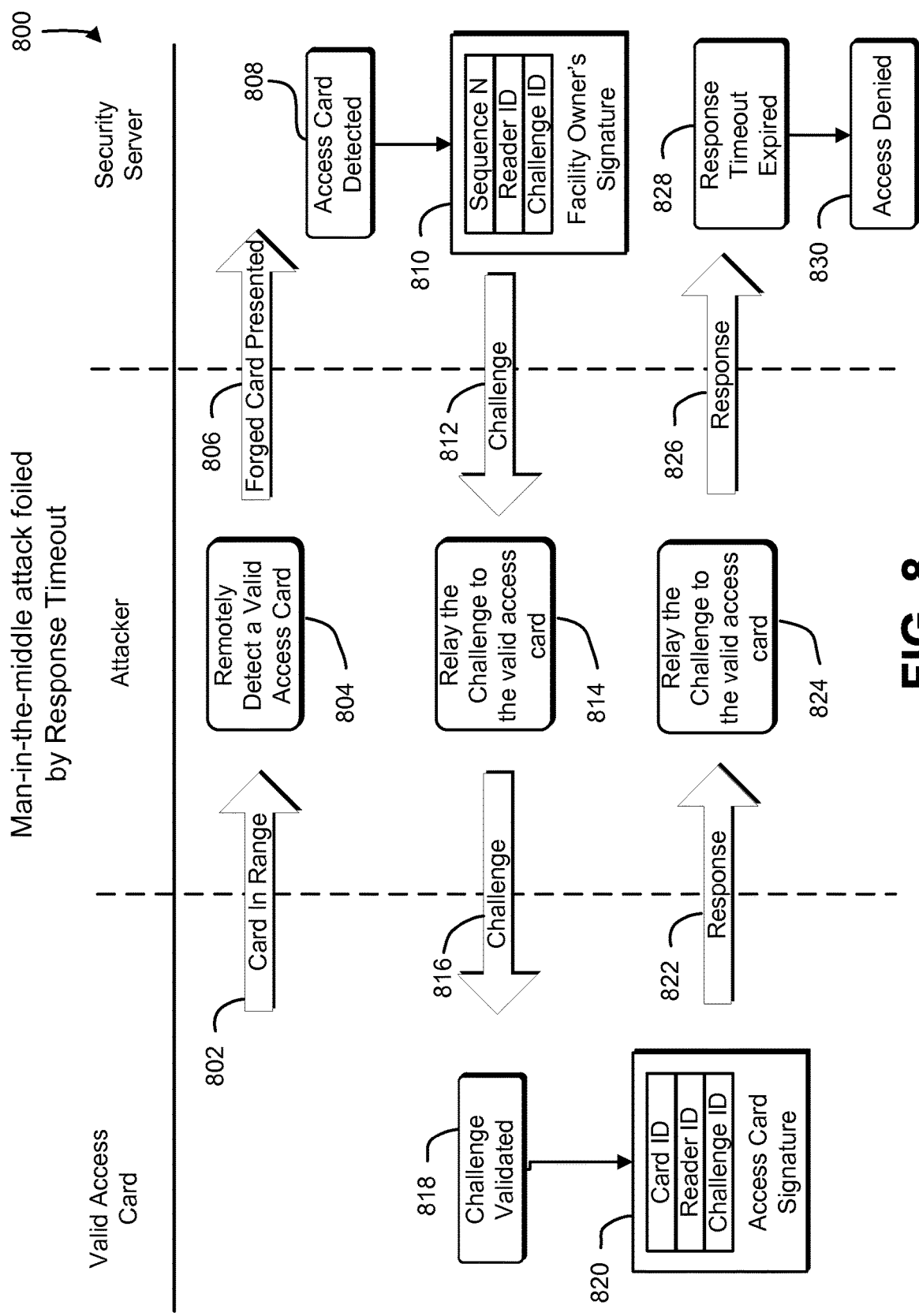
FIG. 8 shows an illustrative example of a man-in-the-middle attack being foiled by an access card system using a response timeout in accordance with an embodiment.

FIG. 8 shows an illustrative example of a man-in-the-middle attack being foiled 800 by an access card system 700 using a response timeout, in the context of the system illustrated in FIG. 7, in accordance with an embodiment. The attack begins when the valid access card 702 is brought within range of the high-gain antenna 704 as represented by the card-in-range arrow 802. At block 804, the unauthorized card reader 708 detects the presence of the valid access card 702 and causes the forged access card 710 to be presented to the card reader 712. The presentation of the forged access card 710 to the card reader 712 is represented by a forged-card-presented arrow 806.

At block 808, the card reader 712 detects the forged access card 710 and signals the security server 716 that an access card is positioned at the card reader 712. The security server 716 generates a challenge message 810 that includes a sequence value, a reader ID, and a challenge ID. The challenge message 810 is digitally signed by the security server. The challenge message 810 is transmitted to the forged access card 710 by the card reader 712 as represented by a first challenge arrow 812. When the challenge message is transmitted, the security server 716 records a challenge transmission time associated with the challenge message 810. At block 814, the attacker relays the challenge message 810 from the forged access card 710, through the unauthorized card reader 708, to the valid access card 702 by way of the high-gain antenna 704. The transmission of the relayed challenge message to the valid access card 702 is represented by a second challenge arrow 816.

At block 818, the valid access card 702 validates the relayed challenge message. In some implementations, the valid access card 702 will determine that the relayed challenge message is valid so long as the content of the challenge message 810 is accurately reproduced. When the relayed challenge message is determined to be valid, the valid access card 702 generates a proper response message 820 and transmits the proper response message 820 to the attacker as represented by a first response arrow 822. At block 824, the attacker relays the proper response message 820 through the forged access card 710 to the card reader 712 as represented by a second response arrow 826.

At block 828, the relayed response is received by the security server 716. The security server 716 compares the current time to the recorded challenge transmission time. The elapsed time is compared to a response timeout value that is adjusted to detect an additional delay caused by the attackers operations at blocks 814 and 824. In one embodiment, the timeout value is determined by measuring the time delay between the transmission of a challenge message and the receiving of a response message when a valid card is positioned near a card reader. The timeout may be set to, for example, a value between the measured time and twice the measured time or some other value greater than the measured time to allow enough time to provide a response, but not enough time for the extra communication and processing required for an attack. Because the additional delay causes the elapsed time to exceed the response timeout value, the relayed response message is determined to be invalid. Since there is no valid response within the response timeout, access to the facility is denied at block 830.

The response timeout can be modified based at least in part on the characteristics of the access card 702 and the security server 716. For example, when particular types of access cards respond slower than other types of access cards, the response timeout is increased for responses sent from access cards of the particular type. Adjustments to the response timeout can also be made when the communication between the card reader 712 and the security server 716 delays the response. For example, when the card reader 712 is connected to the security server 716 over a distance of several kilometers via a computer network, additional delay is added to the response timeout to compensate for the delay caused by network communications.

In some implementations, RF transmission characteristics of the access card 702 are used to validate a transmission from the access card 702. In one example, the signal strength of the access card 702 is measured by the card reader 712 and used at least in part to validate that the transmission originated from the access card 702. In another example, the card reader 712 adjusts an electromagnetic field that is emitted by the card reader 712, and monitors emissions from the access card 702 for an expected change. When the expected change in the emissions from the access card 702 does not occur, the transmissions from the card are determined to be invalid. In yet another example, the card reader 712 listens for multiple transmissions alleging to be from the access card 712, and when multiple transmissions are detected, the transmissions are determined to be invalid.

Figure 9:
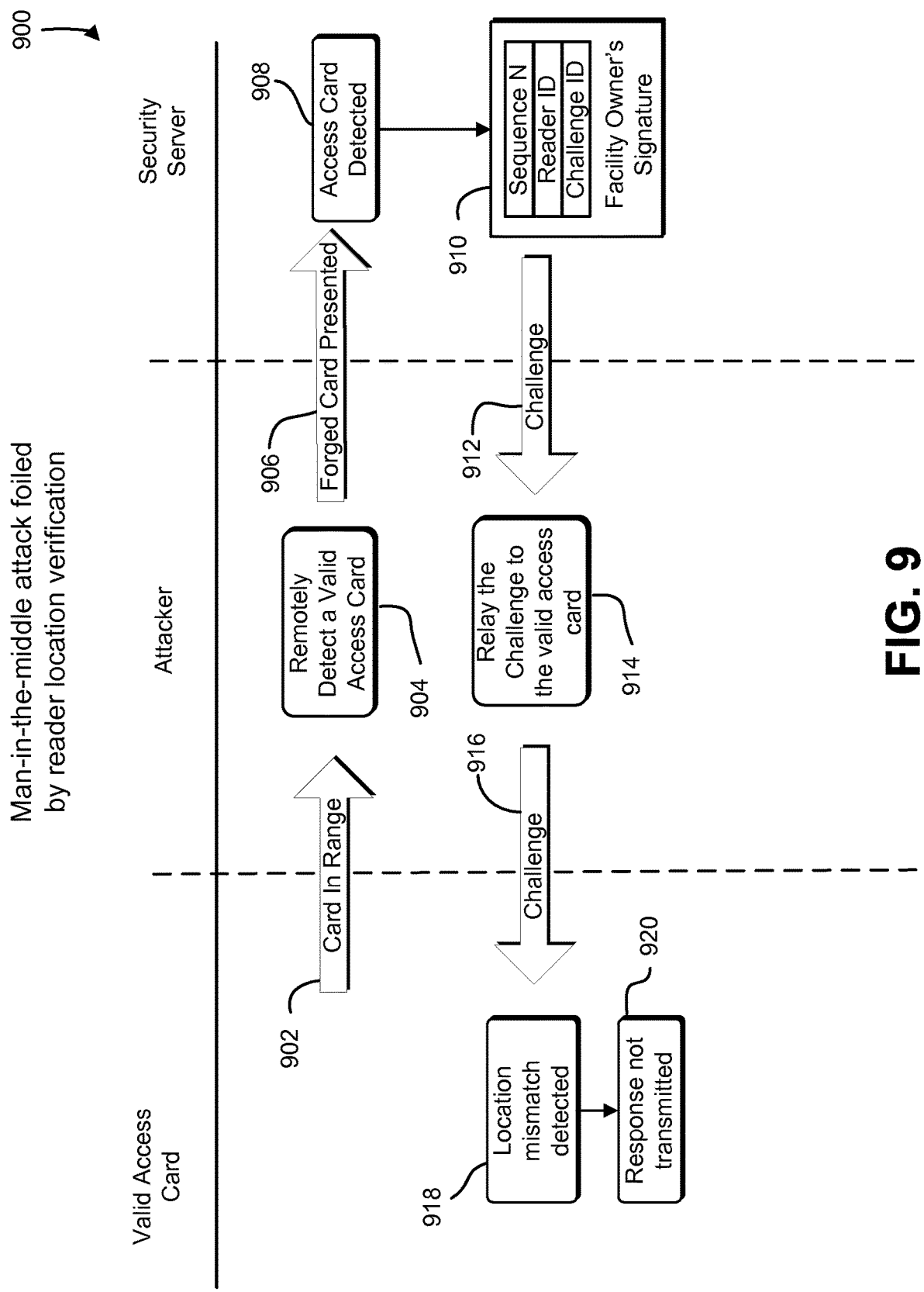
FIG. 9 shows an illustrative example of a man-in-the-middle attack being foiled by an access card system using geolocation in accordance with an embodiment.

FIG. 9 shows an illustrative example of a man-in-the-middle attack being foiled 900 by an access card system using geolocation, in the context of the system illustrated in FIG. 7, in accordance with an embodiment. The attack begins when the valid access card 702 is brought within range of the high-gain antenna 704 as represented by the card-in-range arrow 902. At block 904, the unauthorized card reader 708 detects the presence of the valid access card 702 and causes the forged access card 710 to be presented to the card reader 712. The presentation of the forged access card 710 to the card reader 712 is represented by a forged-card-presented arrow 906. At block 908, the card reader 712 detects the forged access card 710 and signals the security server 716 that an access card has been presented to the card reader 712. The security server 716 generates a challenge message 910 that includes a sequence value, a reader ID, and a challenge ID. The challenge message 910 is digitally signed by the security server. The challenge message 910 is transmitted to the forged access card 710 by the card reader 712 as represented by a first challenge arrow 912. At block 914, the attacker relays the challenge message 910 from the forged access card 710, through the unauthorized card reader 708, to the valid access card 702 by way of the high-gain antenna 704. The transmission of the relayed challenge message to the valid access card 702 is represented by a second challenge arrow 916. At block 918, the valid access card 702 receives the relayed challenge message from the attacker via the high-gain antenna 704.

Upon receiving the relayed challenge message, the valid access card 702 determines a present location by performing a geolocation operation. Geolocation operations may be performed using global positioning system ("GPS"), Wi-Fi based positioning system ("WPS"), LORAN, GLONASS (Globalnaya navigatsionnaya sputnikovaya sistema), GNSS (Galeleo global navigation satellite system), Bluetooth-based positioning system such as Zonith, or other geolocation hardware built into the valid access card 702. In some implementations, the geolocation operation determines that the access card 702 is located within a number of defined regions. For example, in one implementation, geolocation is be determined by detecting the absence or presence of an RF signal that is transmitted by valid card readers.

In some implementations, the geolocation of the card reader 712 is included in the challenge message 910. In another implementation, the valid access card 702 determines the particular location of the card reader that issued the challenge message 910 based at least in part on the reader ID contained in the challenge message 910. When the present location of the valid access card 702 does not approximately match the location of the card reader 712, the man-in-the-middle attack is detected at block 918. In certain implementations, the valid access card 702 includes a database containing geolocations of valid card readers. When the present location of the valid access card 702 is not near at least one of the valid card readers, the man-in-the-middle attack is detected at block 918. At block 920, after a man-in-the-middle attack has been detected, no response message is transmitted. In certain implementations, the attack event is logged on the access card along with the present location, and reported to the security server 716 when the card is later presented to a valid card reader.

In some implementations, a man-in-the-middle attack can be detected by a card reader that detects transmission of a forged challenge message. In this embodiment, in addition to transmitting challenge messages and receiving response messages, the card reader listens for other challenge messages transmitted by other card readers. When the card reader receives a challenge message from another card reader, the card reader validates the challenge message. When the received challenge is not valid, or when the received challenge is a replay of an otherwise valid challenge, any response to the challenge message is deemed invalid. For example, when a nearby attacker attempts to launch a man-in-the-middle-attack from near a secure facility, the attacker records a challenge message from a nearby valid card reader. The attacker then transmits the challenge message to a nearby access card and gets a response message from the access card. However, the nearby card reader also receives the replayed challenge message and recognizes the challenge message as a repeat of the earlier challenge. As a result, any response to the challenge message is deemed invalid, and the attack fails.

Figure 10:
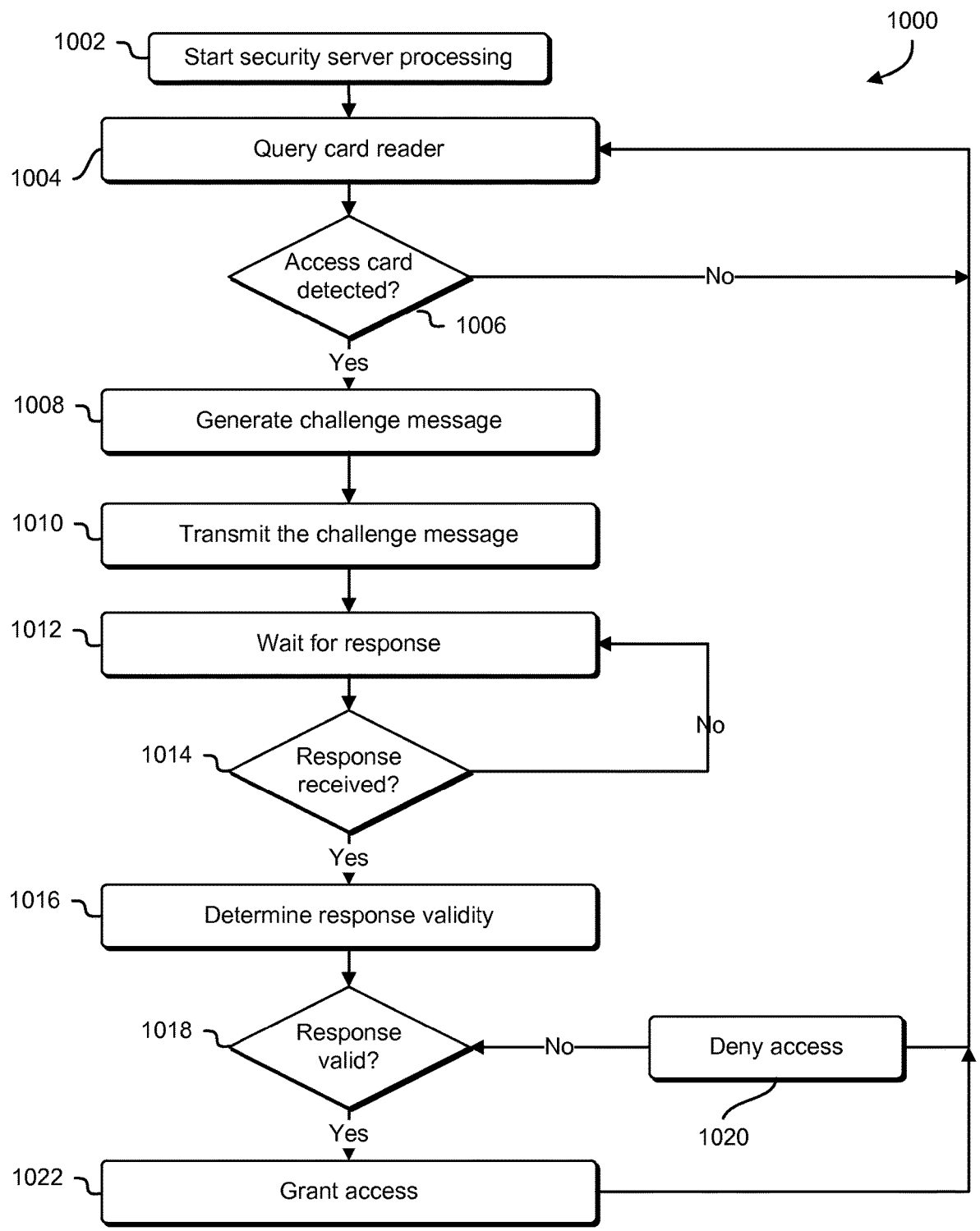
FIG. 10 shows an illustrative example of a security-server process performed by a security server that controls access to a facility in accordance with an embodiment.
Figure 11:
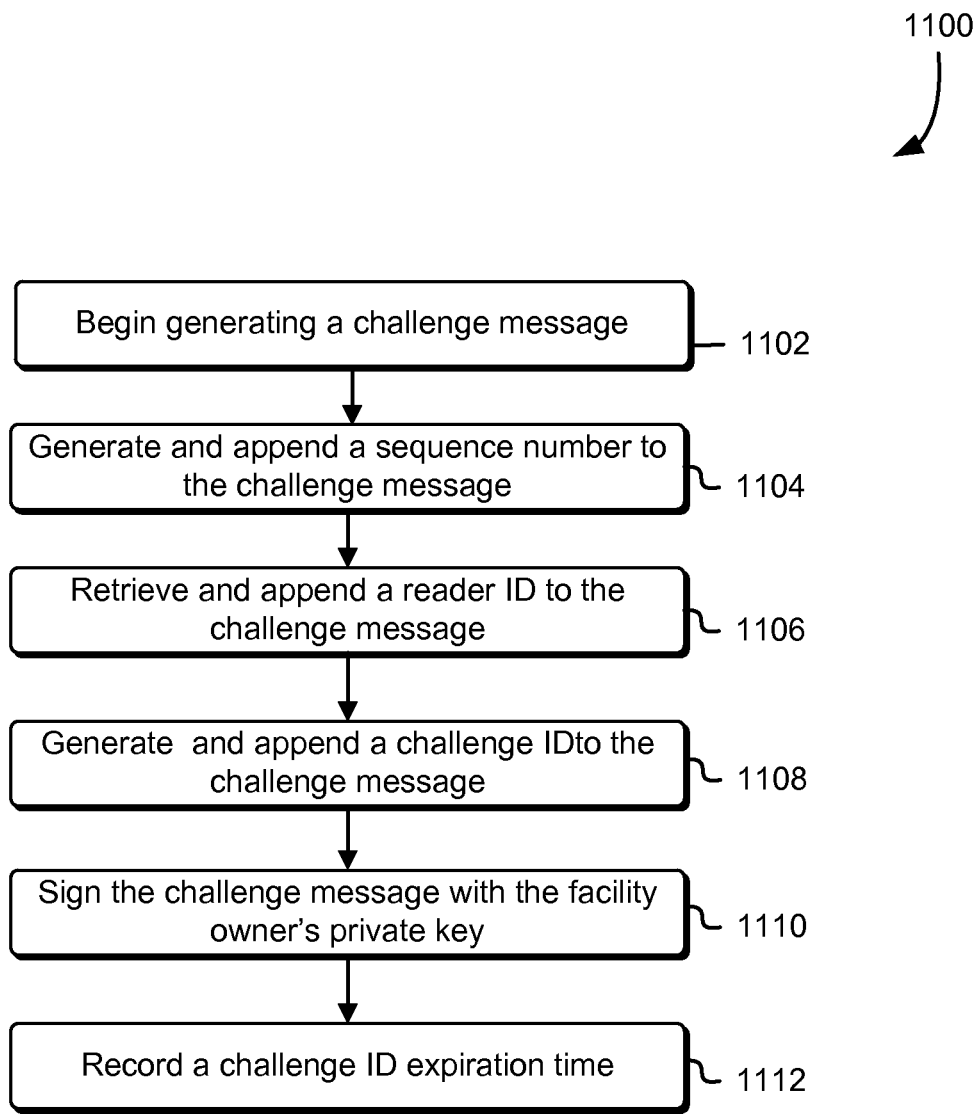
FIG. 11 shows an illustrative example of a process that, when performed, generates a challenge message in accordance with an embodiment.
Figure 12:
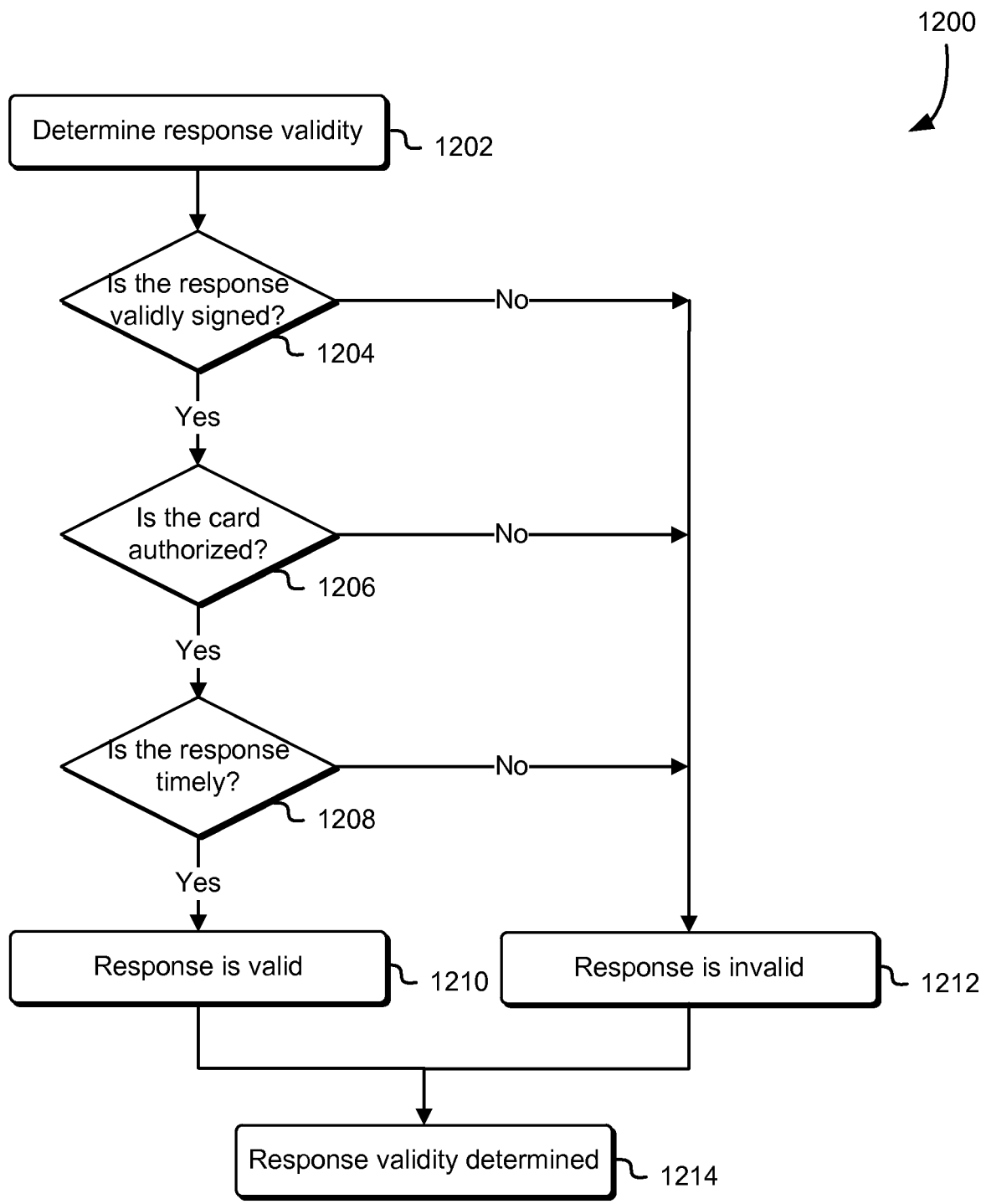
FIG. 12 shows an illustrative example of a process that, when performed, determines the validity of a response is valid in accordance with an embodiment.
Figure 13:
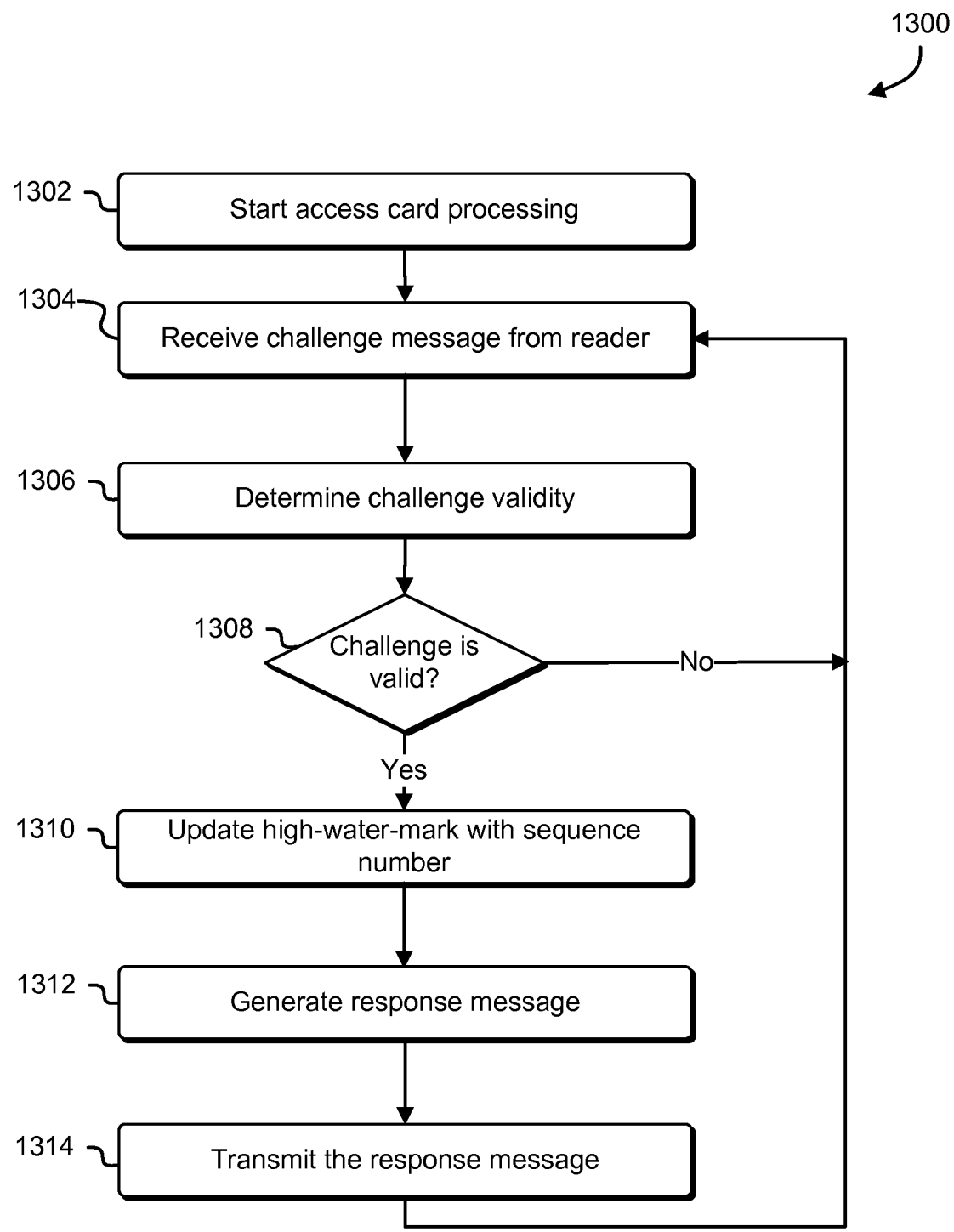
FIG. 13 shows an illustrative example of an access-card process performed by an access card when the access card is presented at a card reader in accordance with an embodiment.
Figure 14:
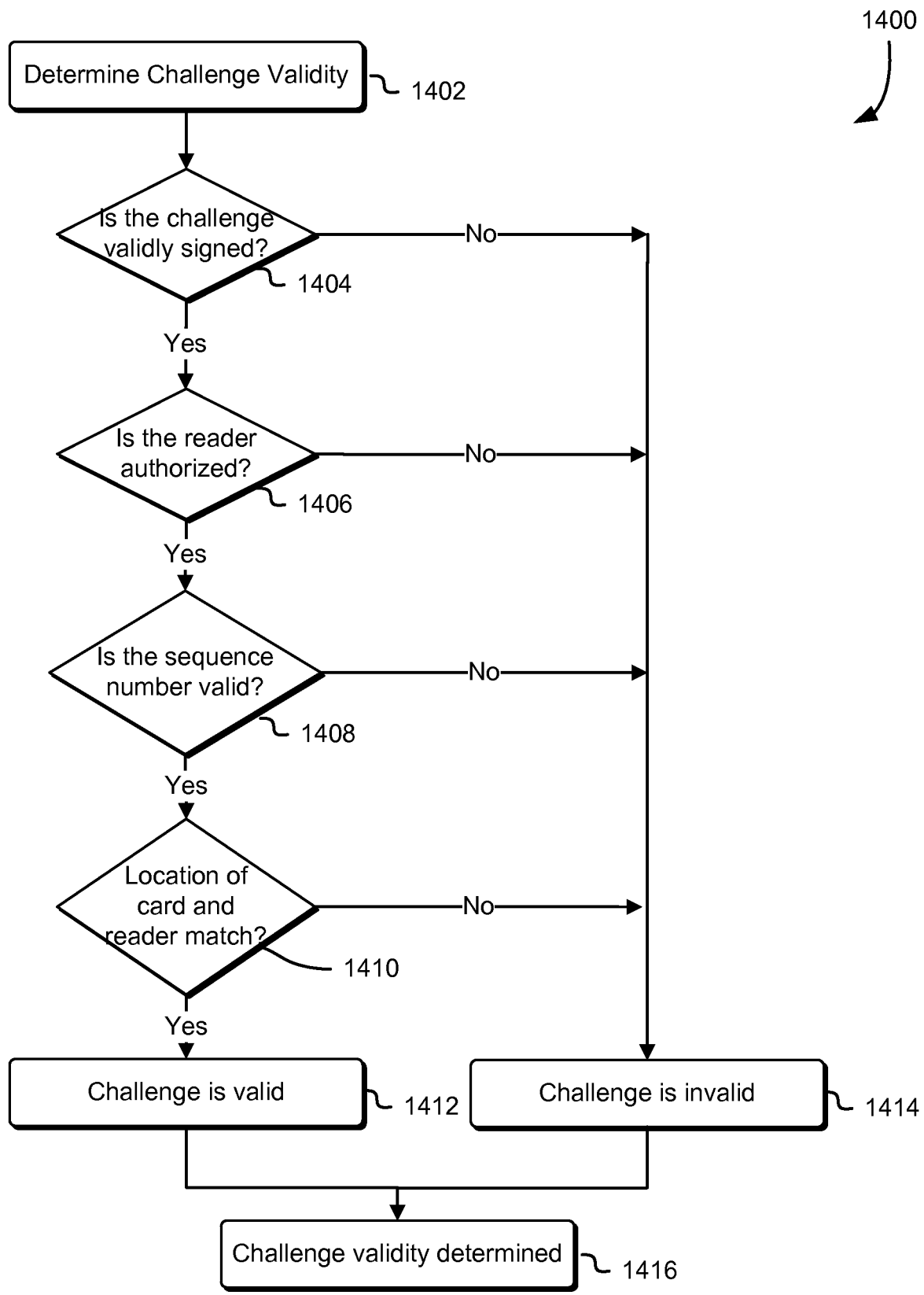
FIG. 14 shows an illustrative example of a process that, when performed, determines the validity of a challenge message in accordance with an embodiment.
Figure 15:
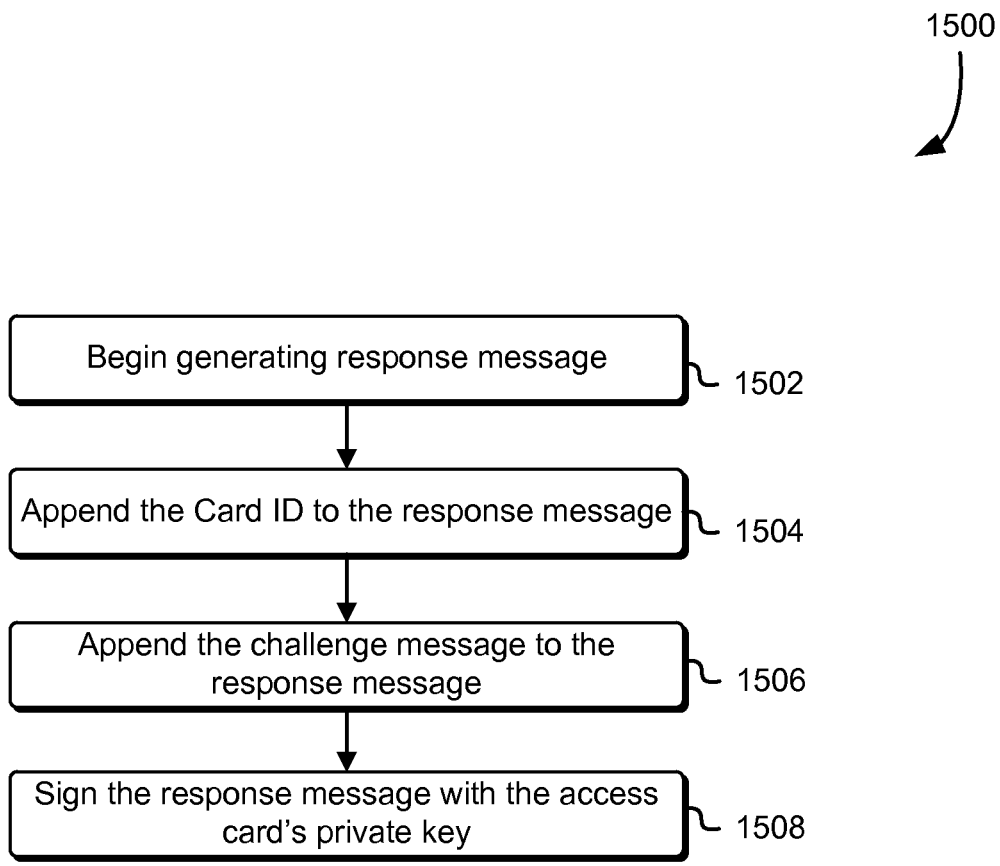
FIG. 15 shows an illustrative example of a process that, when performed, generates a response message in accordance with an embodiment.

In certain implementations, the access card system operates through the interaction of two processes. The first process is a security-server process that, when performed, executes primarily on a particular security server such as the security server 312 illustrated in FIG. 3. An example of a security-server process is illustrated in FIG. 10 through FIG. 12. The second process is an access-card process that is performed by a particular access card such as the access card 202 illustrated in FIG. 2. An example of an access-card process is illustrated in FIG. 13 through FIG. 15.

Various implementations described in the present document describe communications between particular access cards and particular card readers. In some examples, the communications are unencrypted. In other examples, the communications utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

FIG. 10 shows an illustrative example of a security-server process 1000 that, when performed, controls access to a facility in accordance with an embodiment. When performed by a security server, security-server process 1000 allows an authorized cardholder to enter a facility when the authorized cardholder presents their access card to a card reader. The performance of the security-server process begins at block 1002. At block 1004 the security server queries the card reader to determine if an access card is present. In some implementations, the access card is detected when the card reader actively notifies the security server that the access card is present. In another implementation, the access card is detected when the card reader sends a signal that causes the access card to respond to the card reader. When the security server determines 1006 that an access card was detected, execution proceeds to block 1008. When an access card is not detected execution returns to block 1004. At block 1008, the security server generates a challenge message to be sent to the access card. An example of a process that, when performed, generates a challenge message is illustrated in FIG. 11. Next, at block 1010, the security server transmits the challenge message through the card reader to the access card. The security server waits 1012 for the access card to respond to the transmitted challenge message. When the security server determines 1014 that the response message has been received, execution proceeds to block 1016. At block 1016, the security server determines whether the received response message is valid. An example of a process that, when performed, determines when a response message is valid is illustrated in FIG. 12. When the response message is determined 1018 to be invalid, execution proceeds to block 1020 where access to the facility is denied. When the response message is determined 1018 to be valid, execution proceeds to block 1022 where access to the facility is granted. Access to the facility can be granted in a number of ways previously discussed including the activation of toll gates, electronic latches, electric strikes, and so on. In some implementations, the access card system controls access to a computing system or access to a computer network. In such an implementation, access is granted activating a user session on the computer system or authenticating a device for access to the computer network. In some implementations, when access is denied at block 1020, the security server records in the event in a log.

FIG. 11 shows an illustrative example of a process that, when performed, generates a challenge message in accordance with an embodiment. The challenge-generating process 1100 may be performed by a security server as part of a security-server process that, when performed, controls access to a facility when an access card is detected at a card reader. At the beginning 1102 of the challenge-generating process, the challenge message is initialized to an empty message. A sequence value is generated 1104 based at least in part on a timestamp, integer, or other mathematically comparable progression. The sequence value is appended to the challenge message. As various challenge messages are generated by the security server over time, the sequence values generated by the challenge-generating process 1100 increase in value. For a sequence value based at least in part on a timestamp, the sequence value can be read from a system clock. For a sequence value based at least in part on an integer, the sequence value can be incremented when each new challenge message is generated. At block 1106, the security server retrieves a reader ID associated with the card reader, and appends the reader ID to the challenge message. Next, the security server generates 1108 a challenge ID and appends the challenge ID to the challenge message. The challenge ID can be a random number, a sequential number, a timestamp, a cryptographic key, a GUID, or other value that provides uniqueness to the challenge message. The security server digitally signs 1110 the challenge message with a cryptographic key. In some implementations, the security server digitally signs the challenge message with a private cryptographic key maintained as a secret within the security server. In another implementation, the challenge message is signed with a checksum, cyclic redundancy code, or hash value. In yet another implementation, the challenge message is signed by a time-synchronized token such as a one-time use password that is maintained simultaneously on both a security server and the access card.

When the challenge message is dispatched to the card reader for transmission to the access card, the security server records 1112 a response-expiration time for the challenge based at least in part on the current time, and the expected round-trip time of the challenge and response message.

FIG. 12 shows an illustrative example of a process that, when performed, determines the validity of a response is valid in accordance with an embodiment. The response-validating process 1200 may be performed by a security server as part of a security-server process that, when performed, controls access to a facility when an access card transmits a response message to a card reader in response to a challenge message. At the beginning 1202 of the response-validating process, the response message begins a sequence of tests. First, the security server determines 1204 if the response message is validly signed. When the response is validly signed, the security server queries a card authorization database to determine 1206 if the access card has been authorized to grant access to the facility. When the access card has been authorized to grant access to the facility, the security server determines 1208 if the response message was received within a response-expiration time. When the response message is received before the response-expiration time the response message is determined 1210 to be valid. If any of the determinations at decision blocks 1204, 1206, or 1208 are negative, execution proceeds to block 1212 where the response is determined to be invalid. At block 1214 the validity of the response message has been determined.

FIG. 13 shows an illustrative example of an access-card process performed by an access card when the access card is presented at a card reader in accordance with an embodiment. When performed by an access card, access-card process 1300 allows a cardholder to enter a facility by presenting their access card to a card reader. The access-card process begins at block 1302. In certain implementations, performance of the access-card process begins when the access card receives sufficient power from the card reader. At block 1304 the access card receives a challenge message from the card reader. The challenge message includes a sequence value, a reader ID and a challenge ID. In some implementations, the challenge message is signed with a cryptographic key. After the challenge message has been received, the access card determines 1306 if the challenge message is valid. In certain implementations, determining the validity of the challenge message is accomplished by performing a sequence of challenge-message tests that include one or more of: confirming that the reader ID is associated with a particular card reader to which the access card has been granted access; confirming that the reader ID is associated with a card reader that is under the control of the owner of the facility; validating that the challenge message is properly signed by the security server; comparing the sequence value to a high-water-mark stored on the access card to ensure that the received challenge message is newer than past received challenge messages; and comparing the geolocation of the access card to the geolocation of the card reader. An example of a process that, when performed, determines the validity of a challenge message is illustrated in FIG. 14. At decision block 1308, when the access card has determined that the challenge message is valid, execution proceeds to block 1310. When the access card determines that the challenge message is invalid, execution returns to block 1304 where the access card attempts to receive a different challenge message. At block 1310, a high-water-mark value stored on the access card is updated with the sequence value of the valid challenge message. At block 1312, the access card generates a response message for the valid challenge message. An example of a process that, when performed, generates a response message is illustrated in FIG. 15. In certain implementations, a response message includes one or more of: information included in the valid challenge message; information relating to invalid challenge messages that were detected by the access card; a card ID; and a cryptographic signature. After the response message is generated, the response message is transmitted 1314 by the access card, and execution returns to block 1304 where the access card attempts to receive another challenge message.

FIG. 14 shows an illustrative example of a process that, when performed, determines the validity of a challenge message in accordance with an embodiment. When performed by an access card, challenge-validity process 1400 determines whether a challenge message sent by a card reader is valid or invalid. The performance of challenge-validity process begins at block 1402 and proceeds through a sequence of checks that detect when the challenge is invalid.

At decision block 1404, the access card determines whether the challenge message is validly signed. In certain applications, the challenge message is signed using a private cryptographic key maintained as a secret within the security server. A corresponding public cryptographic key is stored on the access card, and is used to verify the signature of the challenge message. In another implementation, the challenge message is signed by a time-synchronized token that is maintained simultaneously on both a security server and the access card. In yet another implementation, the challenge message is signed with a checksum, cyclic redundancy code, or hash value.

When the challenge message is validly signed, execution proceeds to decision block 1406 where the access card determines whether the card reader is an authorized card reader. In some implementations, the access card contains a list of card reader IDs for which the access card is authorized. In another implementation, the access card contains a list of card reader ID's for which the card can be authorized. A reader ID contained within the challenge message is compared to the list of card reader IDs. When the reader ID is present in the list of card reader IDs, the card reader is determined to be an authorized card reader.

At decision block 1408, a sequence value that is contained within the challenge message is compared to a high-water-mark that is stored on the access card. The stored high-water-mark retains the highest sequence value from previously validated challenge messages.

When the sequence value is greater than the high-water-mark, the sequence value is determined to be valid.

At decision block 1410, the access card determines if the access card is in approximately the same location as the card reader. In some implementations, the geolocation of the access card is determined using GPS or WiFi location services hardware on the access card. In another implementation, the geolocation of a number of card readers is stored on the access card, indexed by a reader ID. Using the reader ID contained within the challenge message, the access card looks up the geolocation of the card reader that transmitted the challenge message. In yet another implementation, the geolocation of the card reader is included in the challenge message. When the geolocation of the access card approximately matches the geolocation of the card reader, the access card determines that the access card and card reader are in the same location.

At block 1412, after the sequence of validation tests is complete, the challenge message is determined to be valid. When any of the validation tests performed at decision blocks 1404, 1406, 1408, and 1410 are negative, execution proceeds to block 1414 and the challenge message is determined to be invalid. At block 1416, the challenge-validation process is complete.

FIG. 15 shows an illustrative example of a process that, when performed, generates a response message in accordance with an embodiment. When performed by an access card, response-generating process 1500 generates a response message to a challenge message. The performance of the response-validity process begins at block 1502, where the response message is initialized to an empty message. At block 1504 a card ID that is stored on the access card is added to the response message. In some implementations, the card ID is used by the receiver of the response message to identify the access card. At block 1506, content from the challenge message is appended to the response message. In some implementations, the receiver of the response message verifies that the response message contains the correct information from the previously-transmitted challenge message. Finally, at block 1508, the response message is digitally signed by the access card. In certain applications, the response message is signed using a private cryptographic key stored on the access card. A corresponding public cryptographic key is stored on a security server, and is used to verify the signature on the response message. In another implementation, the response message is signed by a time-synchronized token that is maintained simultaneously on both the security server and the access card. In yet another implementation, the response message is signed with a checksum, cyclic redundancy code, or hash value.

Figure 16:
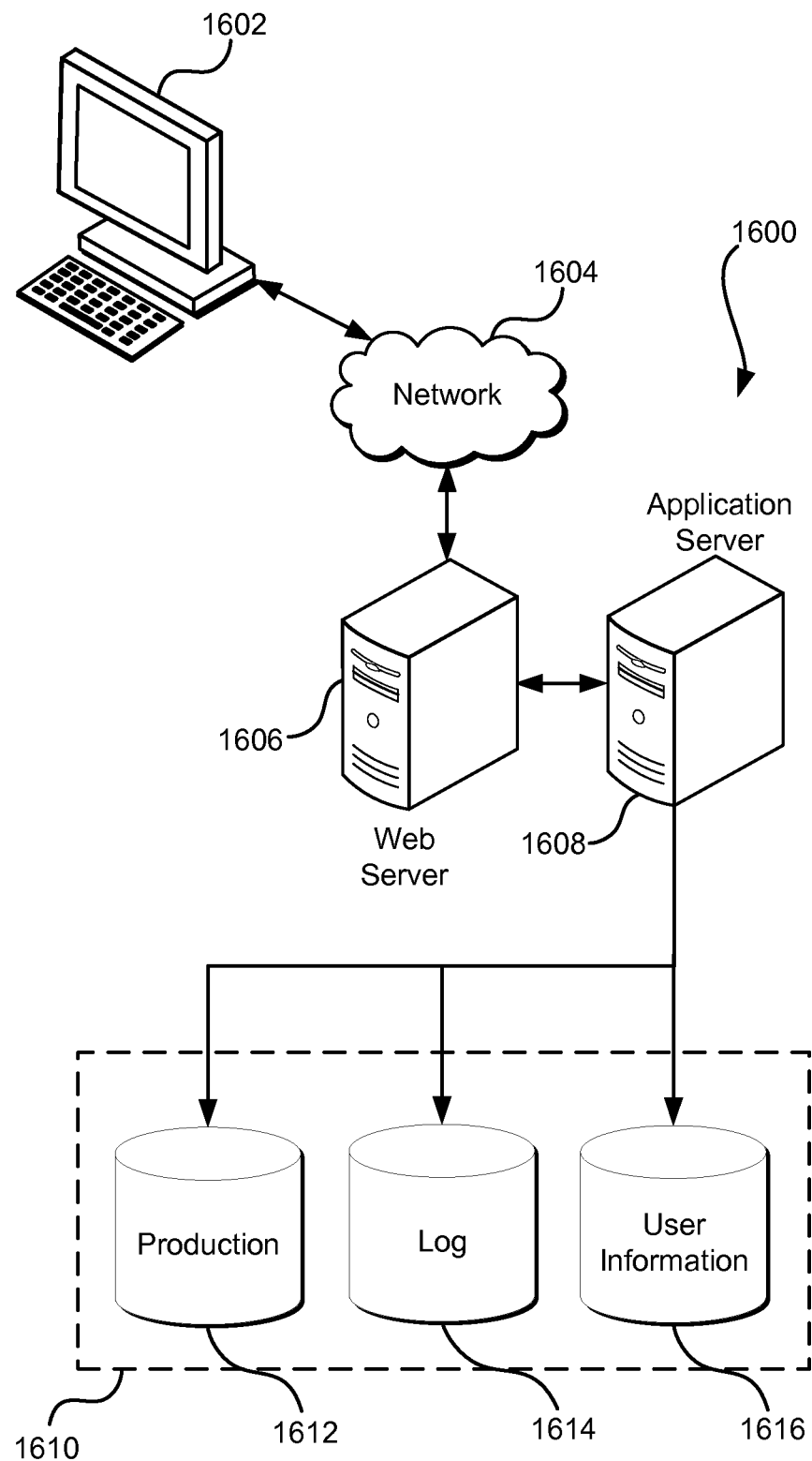
FIG. 16 illustrates an environment in which various embodiments can be implemented in accordance with an embodiment.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of requests and responses, as well as the delivery of content between the client device 1602 and the application server 1608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An access-control system comprising:
   a card reader configured to transmit a challenge message that includes a first sequence value;
   an access card configured to determine validity of the challenge message based at least in part on the first sequence value and a high-water-mark value stored on the access card, the high-water mark value based at least in part on a second sequence value associated with a previously-received valid challenge message, and in response to determining that the challenge message is valid, transmit a response message and update the high-water-mark value based at least in part on the first sequence value; and
   a security server configured to:
      determine that the response message is valid as a result of a timespan between a first recorded time when the challenge message is transmitted and a second recorded time when the response message is received does not exceed a threshold value; and
      as a result of determining that the response message is valid, cause an access control point device to grant access to an enclosed physical space.

2. The access-control system of claim 1, wherein the access card determines the validity of the challenge message at least in part by:
   determining a geolocation of the access card;
   determining a geolocation of the card reader; and
   determining that the challenge message is invalid when the distance between the geolocation of the access card and the geolocation of the card reader exceeds a threshold.

3. The access-control system of claim 1, wherein:
   the access card is further configured to digitally sign the response message using a first private cryptographic key, thereby generating a response-message signature; and
   the security server is further configured to determine the validity of the response message by at least in part validating the response-message signature using a first public cryptographic key, and as a result of determining that the response message is invalid, recording the response message in a log.

4. The access-control system of claim 3, wherein:
   the security server is further configured to digitally sign the challenge message with a challenge-message signature using a second private cryptographic key;
   the access card is further configured to determine the validity of the challenge message by at least in part validating the challenge-message signature using a second public cryptographic key; and
   the security server further configured to, as a result of determining that the response message is invalid, transmit a disabling-challenge message to the access card that prevents the access card from responding to additional challenge messages.

5. The access-control system of claim 4, wherein the validity of the challenge message is determined at least in part by the access card:
   determining whether a reader identifier that is included in the challenge message is present in a collection of reader identifiers stored on the access card; and
   as a result of determining that the reader identifier is not present in the collection, determining that the challenge message is invalid.

6. One or more devices, comprising:
   a card reader configured to transmit a challenge message that includes a first sequence value;
   an access card configured to determine validity of the challenge message based at least in part on the first sequence value and a high-water-mark value stored on the access card, the high-water mark value based at least in part on a second sequence value associated with a previously-received valid challenge message, and in response to determining that the challenge message is valid, transmit a response message and update the high-water-mark value based at least in part on the first sequence value; and
   a security server configured to:
      determine that the response message is valid as a result of a timespan between a first recorded time when the challenge message is transmitted and a second recorded time when the response message is received does not exceed a threshold value; and
      as a result of determining that the response message is valid,
   cause an access control point device to grant access to an enclosed physical space.

7. The one or more devices of claim 6, wherein the access card determines the validity of the challenge message at least in part by:
   determining a geolocation of the access card;
   determining a geolocation of the card reader; and
   determining that the challenge message is invalid when the distance between the geolocation of the access card and the geolocation of the card reader exceeds a threshold.

8. The one or more devices of claim 6, wherein:
   the access card is further configured to digitally sign the response message using a first private cryptographic key, thereby generating a response-message signature; and
   the security server is further configured to determine the validity of the response message by at least in part validating the response-message signature using a first public cryptographic key, and as a result of determining that the response message is invalid, recording the response message in a log.

9. The one or more devices of claim 8, wherein:
   the security server is further configured to digitally sign the challenge message with a challenge-message signature using a second private cryptographic key;
   the access card is further configured to determine the validity of the challenge message by at least in part validating the challenge-message signature using a second public cryptographic key; and
   the security server further configured to, as a result of determining that the response message is invalid, transmit a disabling-challenge message to the access card that prevents the access card from responding to additional challenge messages.

10. The one or more devices of claim 9, wherein the validity of the challenge message is determined at least in part by the access card:
    determining whether a reader identifier that is included in the challenge message is present in a collection of reader identifiers stored on the access card; and
    as a result of determining that the reader identifier is not present in the collection, determining that the challenge message is invalid.

11. A computer-implemented method, comprising:
    transmitting, by a card reader, a challenge message that includes a first sequence value;
    determining, by an access card, validity of the challenge message based at least in part on the first sequence value and a high-water-mark value stored on the access card, the high-water mark value based at least in part on a second sequence value associated with a previously-received valid challenge message, and in response to determining that the challenge message is valid, transmit a response message and update the high-water-mark value based at least in part on the first sequence value;
    determining, by a security server, that the response message is valid as a result of a timespan between a first recorded time when the challenge message is transmitted and a second recorded time when the response message is received does not exceed a threshold value; and
    as a result of determining that the response message is valid, cause an access control point device to grant access to an enclosed physical space.

12. The computer-implemented method of claim 11, wherein the access card determines the validity of the challenge message at least in part by:
    determining a geolocation of the access card;
    determining a geolocation of a card reader; and
    determining that the challenge message is invalid when the distance between the geolocation of the access card and the geolocation of the card reader exceeds a threshold.

13. The computer-implemented method of claim 11, wherein:
    the access card is further configured to digitally sign the response message using a first private cryptographic key, thereby generating a response-message signature; and
    the security server is further configured to determine the validity of the response message by at least in part validating the response-message signature using a first public cryptographic key, and as a result of determining that the response message is invalid, recording the response message in a log.

14. The computer-implemented method of claim 13, wherein:
    the security server is further configured to digitally sign the challenge message with a challenge-message signature using a second private cryptographic key;
    the access card is further configured to determine the validity of the challenge message by at least in part validating the challenge-message signature using a second public cryptographic key; and
    the security server further configured to, as a result of determining that the response message is invalid, transmit a disabling-challenge message to the access card that prevents the access card from responding to additional challenge messages.

15. The computer-implemented method of claim 14, wherein
- the validity of the challenge message is determined at least in part by the access card:
- determining whether a reader identifier that is included in the challenge message is present in a collection of reader identifiers stored on the access card; and
- as a result of determining that the reader identifier is not present in the collection, determining that the challenge message is invalid.

* * * * *